(12) United States Patent
Hamilton

(10) Patent No.: US 9,518,804 B2
(45) Date of Patent: Dec. 13, 2016

(54) LASER RANGEFINDER WITH IMPROVED DISPLAY

(71) Applicant: Sheltered Wings, Inc., Middleton, WI (US)

(72) Inventor: David M. Hamilton, Mont Horeb, WI (US)

(73) Assignee: Sheltered Wings, Inc., Middleton, WI (US)

( * ) Notice: Subject to any disclaimer, the term of this patent is extended or adjusted under 35 U.S.C. 154(b) by 0 days.

(21) Appl. No.: 14/465,611

(22) Filed: Aug. 21, 2014

(65) Prior Publication Data

US 2015/0055119 A1    Feb. 26, 2015

Related U.S. Application Data

(60) Provisional application No. 61/868,930, filed on Aug. 22, 2013, provisional application No. 61/935,667, filed on Feb. 4, 2014.

(51) Int. Cl.
| | | |
|---|---|---|
| *G01C 3/08* | (2006.01) | |
| *F41G 3/06* | (2006.01) | |
| *F41G 1/473* | (2006.01) | |
| *G01C 3/04* | (2006.01) | |
| *F41G 3/08* | (2006.01) | |
| *G01S 17/10* | (2006.01) | |

(52) U.S. Cl.
CPC ............... *F41G 3/065* (2013.01); *F41G 1/473* (2013.01); *F41G 3/08* (2013.01); *G01C 3/04* (2013.01); *G01S 17/10* (2013.01)

(58) Field of Classification Search
CPC ........ G01S 17/89; G01S 7/4817; G01S 17/42; G01C 3/08; G01C 15/002
See application file for complete search history.

(56) References Cited

U.S. PATENT DOCUMENTS

| | | | |
|---|---|---|---|
| 3,475,821 A | 11/1969 | Huddleston | |
| 3,609,299 A * | 9/1971 | Wright | G06G 1/0052 235/61 NV |
| 3,744,133 A | 7/1973 | Fukushima et al. | |
| 5,291,262 A | 3/1994 | Dunne | |
| 5,574,552 A | 11/1996 | Dunne | |
| 5,914,775 A | 6/1999 | Hargrove et al. | |
| 5,920,995 A | 7/1999 | Sammut | |
| 6,032,374 A | 3/2000 | Sammut | |
| 6,327,806 B1 | 12/2001 | Paige | |
| 6,405,107 B1 * | 6/2002 | Derman | G01C 23/005 340/3.5 |
| 6,453,595 B1 | 9/2002 | Sammut | |
| 6,516,699 B2 | 2/2003 | Sammut et al. | |

(Continued)

OTHER PUBLICATIONS

International Search Report for PCT/US14/52161 mailed Dec. 2, 2014.

*Primary Examiner* — Luke Ratcliffe
*Assistant Examiner* — Samantha K Abraham
(74) *Attorney, Agent, or Firm* — Husch Blackwell LLP

(57) ABSTRACT

A rangefinder having improved display capabilities. The rangefinder has a ranging system, a processor, and a display. The rangefinder may have a multi-position button for inputting data, and may also have an inertial navigation unit. The rangefinder has improved input and tracking of wind direction and speed, allowing for improved ballistic compensation for wind.

11 Claims, 20 Drawing Sheets

(56) References Cited

U.S. PATENT DOCUMENTS

| | | | |
|---|---|---|---|
| 6,681,512 B2 | 1/2004 | Sammut | |
| 6,873,406 B1 | 3/2005 | Hines et al. | |
| 6,933,859 B2 * | 8/2005 | Hurt | G01D 7/02 340/945 |
| 7,516,571 B2 * | 4/2009 | Scrogin | F41G 1/38 42/114 |
| 7,603,804 B2 | 10/2009 | Zaderey et al. | |
| 7,654,029 B2 | 2/2010 | Peters et al. | |
| 7,658,031 B2 | 2/2010 | Cross et al. | |
| 7,690,145 B2 | 4/2010 | Peters et al. | |
| 7,746,343 B1 * | 6/2010 | Charaniya | G06F 3/04815 345/428 |
| 7,832,137 B2 | 11/2010 | Sammut | |
| 7,856,750 B2 | 12/2010 | Sammut et al. | |
| 7,937,878 B2 | 5/2011 | Sammut et al. | |
| 8,046,951 B2 * | 11/2011 | Peters | F41G 1/473 356/11 |
| 8,072,581 B1 * | 12/2011 | Breiholz | G01S 7/51 356/4.01 |
| 8,109,029 B1 | 2/2012 | Sammut et al. | |
| 8,172,139 B1 * | 5/2012 | McDonald | F41G 3/02 235/404 |
| 8,468,930 B1 * | 6/2013 | Bell | F41G 11/001 342/67 |
| 8,529,380 B1 * | 9/2013 | Hubenthal | G06Q 50/10 473/222 |
| 8,650,220 B2 * | 2/2014 | Rohlf | G06F 17/30241 345/653 |
| 8,713,843 B2 * | 5/2014 | Windauer | F41G 1/38 235/404 |
| 9,062,961 B2 * | 6/2015 | Chen | G01B 11/00 |
| 9,151,570 B2 * | 10/2015 | Plaster | F41G 1/38 |
| 2005/0021282 A1 * | 1/2005 | Sammut | F41G 1/38 702/150 |
| 2005/0268521 A1 * | 12/2005 | Cox | F41G 1/38 42/130 |
| 2006/0214935 A1 * | 9/2006 | Boyd et al. | 345/473 |
| 2006/0273932 A1 | 12/2006 | Wise | |
| 2007/0103671 A1 | 5/2007 | Ash | |
| 2008/0202011 A1 * | 8/2008 | Shepherd | F41G 1/44 42/130 |
| 2008/0218612 A1 | 9/2008 | Border et al. | |
| 2011/0168777 A1 * | 7/2011 | Bay | F41G 3/06 235/414 |
| 2011/0297744 A1 | 12/2011 | Schneider et al. | |
| 2012/0186131 A1 | 7/2012 | Windauer | |
| 2013/0014421 A1 | 1/2013 | Sammut et al. | |
| 2014/0115942 A1 * | 5/2014 | Plaster | F41G 1/38 42/126 |

\* cited by examiner

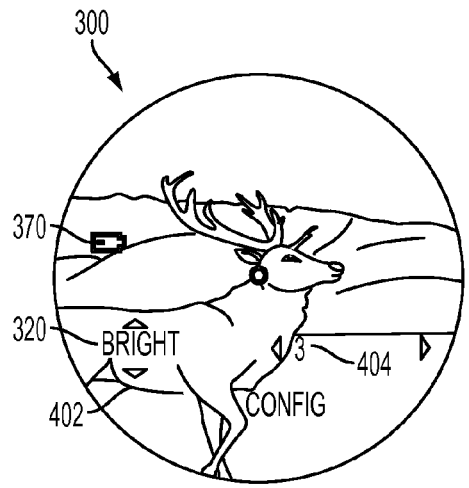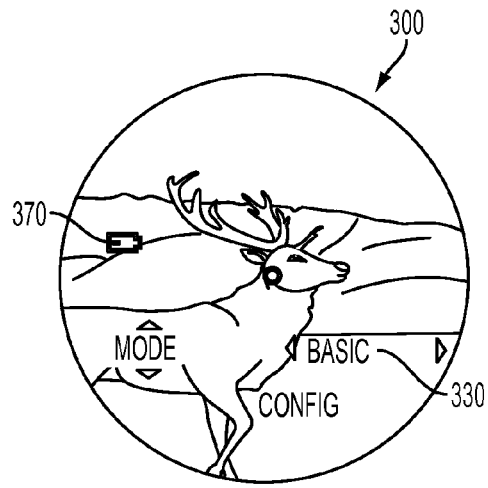
FIG. 8    FIG. 9
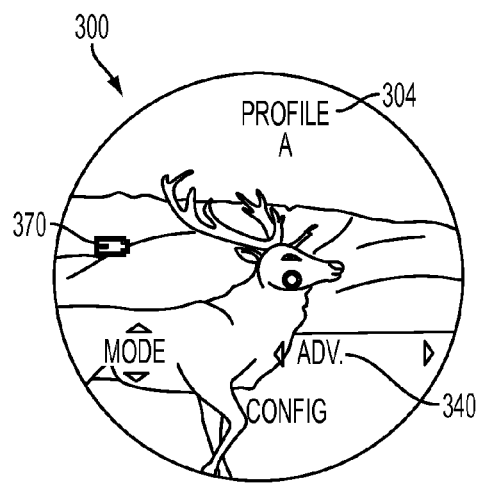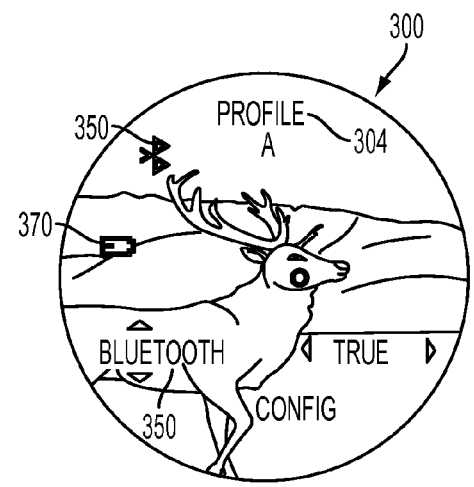
FIG. 10    FIG. 11

LASER RANGEFINDER WITH IMPROVED DISPLAY

CROSS REFERENCE TO RELATED APPLICATIONS

This application claims the benefit of: U.S. Provisional Patent Application Ser. No. 61/868,930, filed Aug. 22, 2013; and U.S. Provisional Patent Application Ser. No. 61/935,667, filed Feb. 4, 2014; the disclosures of which are hereby incorporated by reference herein in their entireties for all purposes.

FIELD OF THE INVENTION

The present invention relates generally to the field of range-finding devices. More particularly, the present invention relates to a rangefinder with improved display and wind capabilities.

BACKGROUND

Rangefinders can provide important data to aid a shooter in many applications, for example, hunting, competition shooting, military or law enforcement, in making precise shots on targets. Many conventional rangefinders use a laser beam to determine distance to an object by calculating the time it takes for a laser pulse of light to reach a target and be reflected back to the source. As computers have become more powerful and smaller, it has become increasingly popular to incorporate computers in laser rangefinders to provide ballistic data to the shooter based on a variety of parameters such as the specific rifle, bullet or environmental factors. One problem with such devices is that they can be cumbersome to program or customize because of the amount of data needed to be entered to provide accurate ballistics.

Most conventional ballistic rangefinders are one of two types. As shown in FIG. 1, the first type is a basic rangefinder 12 that uses generic ballistics formulas and computing with a relatively simple interface. Such basic rangefinders 12 do not need many buttons because there are not many features, although, as explained below, the menus for such basic rangefinders 12 can be cumbersome because of the limited button options. As shown in FIG. 1, the basic rangefinder has two buttons, namely a laser fire button 10 and a menu button 20, both of which are single position (press down) buttons. Actuation of the laser fire button 10 causes the basic rangefinder 12 to take measurements, such as the range, when in range mode. Actuation of the menu button 20 causes the basic rangefinder 12 to enter a menu mode wherein a limited number of options can be selected such as, LED screen brightness or ranging mode style. An example of this style of rangefinder menu entry can be found in the Vortex Optics Ranger 1000 Rangefinder. However, even entry of this limited information can be confusing due to the limited button press combinations. Some basic rangefinders 12 lump multiple bullet classes together and average them to provide a generic ballistic solution. For shorter range shots (less than 500 yards) this may be acceptable. For longer range shots or extremely precise shots, this is often not accurate enough.

The second type of rangefinder is a more advanced rangefinder 100 as seen in FIG. 2. Advanced rangefinder 100 allows the user to enter many variables, such as the bullet's ballistic coefficient, muzzle velocity, barometric pressure, elevation, bullet drag model, scope height, zero range, and a number of other factors to give an extremely precise ballistic solution to the user. However, entry of such data to initially set up existing advanced rangefinders 100 is cumbersome and confusing. As seen in FIG. 2, one such example of an advanced rangefinder 100 is the Gunwerks G7 BR2 rangefinder. This device has four different buttons, each of which are single position (press down). The user must press the laser fire button 110 to cause the advanced rangefinder 100 to take a measurement, or may press and hold the mode button 120 to access the menu mode. Once in the menu mode, the user needs to cycle through various main menu headings as well as adjust individual menu selections using the up arrow button 130 and the down arrow button 140. This requires pressing multiple buttons using two hands located at different positions around the device. The G7 BR2 is an advanced rangefinder, but is difficult to program. For example, to accurately calculate ballistic data specific to the user of that rangefinder, the user must input information into the device, including environmental factors such as wind speed and direction, in addition to information about the firearm being used, such as caliber, barrel twist, twist direction, muzzle velocity, etc. Finally, the user must also input information about the ammunition itself, including but not limited to ballistic coefficient, bullet weight, and bullet length. Further, advanced rangefinders 100, such as the G7 BR2, are more expensive due to the increased labor and manufacturing as a result of having more buttons and a larger form factor. Advanced rangefinder 100 is also more susceptible to liquid and debris entry because the large number of buttons provides a large number of entry points.

Another issue with typical laser rangefinders is that they do not allow a user to store information related to multiple set-ups. For example, if a shooter has multiple rifles, and he wants to use the same laser rangefinder for all of his guns, he must enter the entire set of data for available parameters into the rangefinder every time he switches guns. This can be a time consuming and frustrating process, especially if the user wants to switch guns with any frequency.

Yet another issue with existing rangefinders relates to the sophistication of the ballistics features. Some existing ballistics rangefinders offer generic ballistics formulae and computing in order to make the user interface easier, but these rangefinders are often not accurate or customizable enough for serious shooters. As a result, there is a need for a way to provide a feature-rich ballistic program in a package that is easy for users to input their customized data, and further allows the user to store such customized data for multiple gun/ammunition combinations.

To help with information input, some existing rangefinders that allow ballistic programming include many buttons, which makes them expensive to make and confusing to use. Additionally, including additional buttons necessitate a larger form factor device housing to provide adequate space for the buttons. The more confusing a rangefinder is, the less likely a user is to utilize all the available features, thereby making the user less accurate than he or she can otherwise be. Including additional buttons also often translates to an increase in expense, labor intensiveness, and difficultly to manufacture, and increases the number of entry points for liquid and debris to enter the rangefinder.

Other existing rangefinders have feature-rich ballistic programs, but offer only a couple of single position buttons. Such rangefinders are also confusing because it can be difficult to determine which buttons to press and in what order to enter the menu mode, to cycle menu options, or to cycle the menu option's setting. In particular, existing rangefinders do not have an intuitive way of inputting wind speed and direction. Therefore, there is a need for an easy to use rangefinder with a feature-rich ballistic program, but with as few intuitive buttons as possible to allow a user to navigate a display/menu layout that is easy to use.

Another difficulty with current ballistics rangefinders involves wind data. Wind is particularly noteworthy in shooting because wind can have a large effect on a bullet's trajectory, and because it is difficult to directly measure given that it is constantly changing. It would thus be advantageous to have a device or feature built into rangefinder that aids the user in keeping track of their wind direction and velocity. There currently are devices on the market that can directly measure wind, but they are large, expensive, or heavy on battery consumption. For example the Venom LX unit made by Torrey Pines reads real time wind for shooters. Although this device can calculate and track real time wind, it would be an advantage to hunters, military, and law enforcement personnel to have a similar feature, but was one that was inexpensive, portable enough to fit into a hand-held laser rangefinder, used little to no additional battery power, and easy enough to use that it kept track of wind data with minimal user inputs.

When reading wind data, the conventional method is to identify the direction the wind is coming from, followed by the wind velocity. For example, a wind of 360 degrees at 10 mph means that wind is coming from 360 degrees (due north) going to the south, at 10 mph. This convention is often misunderstood by a layman, where as a weather person, pilot, or someone who is required to know intimate details of weather, will understand this correctly. Because of this, it is important that the wind entry be intuitive to all people, and that there is no mistaking the wind direction.

SUMMARY

The invention provides a rangefinder for measuring a distance to a target. According to the invention, the rangefinder includes a body, the body including a display. A ranging system and a processor are mounted within the body, the processor capable of controlling information for showing on the display. A first button is mounted on the body in communication with the ranging system. A second button is mounted on the body in communication with the processor, the second button being a multi-position button. An inertial navigation unit may be mounted within the body in communication with the processor. Actuating the first button causes the rangefinder to take a range measurement. Actuation of the multi-position button allows for adjustment of settings for operation of the rangefinder. Actuation of the multi-position button can also allow for entry of data into the processor. The multi-position button can be a 5-position button. The rangefinder may communicate with a remote computing device using a wireless connection.

It will be understood by those skilled in the art that one or more aspects of this invention can meet certain objectives, while one or more other aspects can lead to certain other objectives. Other objects, features, benefits and advantages of the present invention will be apparent in this summary and descriptions of the disclosed embodiment(s), and will be readily apparent to those skilled in the art. Such objects, features, benefits and advantages will be apparent from the above as taken in conjunction with the accompanying figures and all reasonable inferences to be drawn therefrom.

BRIEF DESCRIPTION OF THE DRAWINGS

FIG. 8 is a view of the rangefinder of FIG. 4 when in "menu mode," showing a brightness adjustment setting.

FIG. 9 is a view of the rangefinder of FIG. 4 when in "menu mode," showing a "basic" mode setting option.

FIG. 10 is a view of the rangefinder of FIG. 4 when in "menu mode," showing an "advanced" mode setting option.

FIG. 11 is a view of the rangefinder of FIG. 4 when in "menu mode," showing that Bluetooth connectivity is enabled.

DETAILED DESCRIPTION

Figure 1:
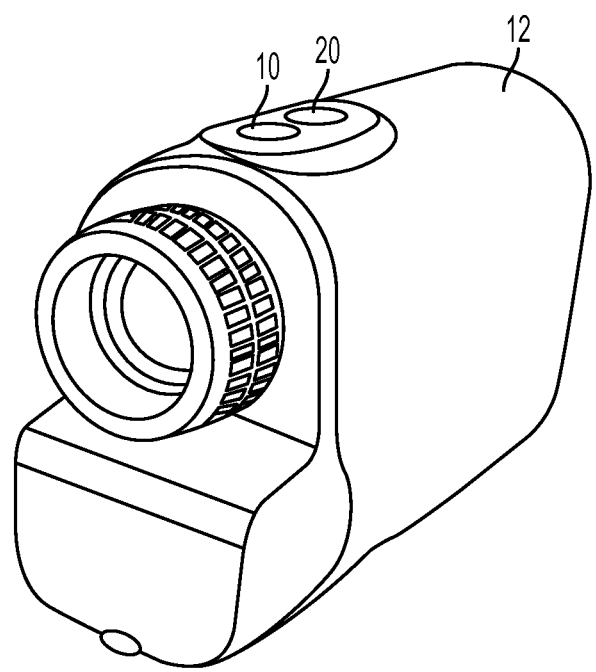
FIG. 1 is a perspective view of a basic prior art rangefinder.
Figure 2:
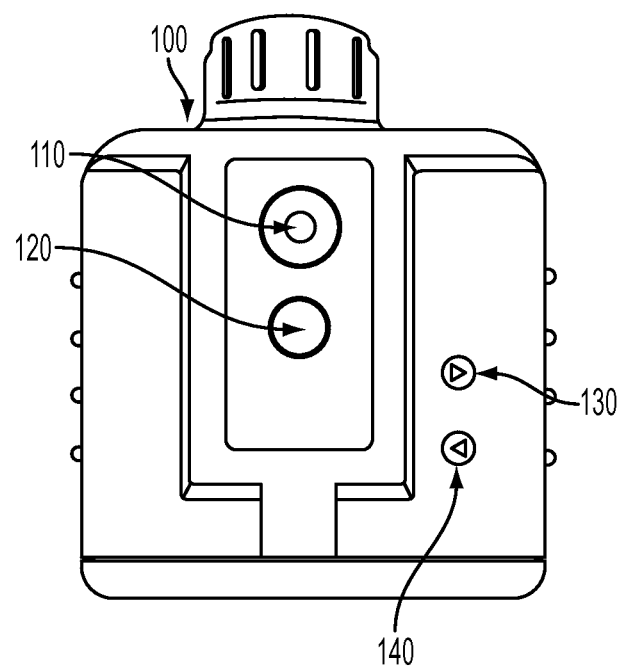
FIG. 2 is a top view of a more advanced prior art rangefinder.
Figure 3A:
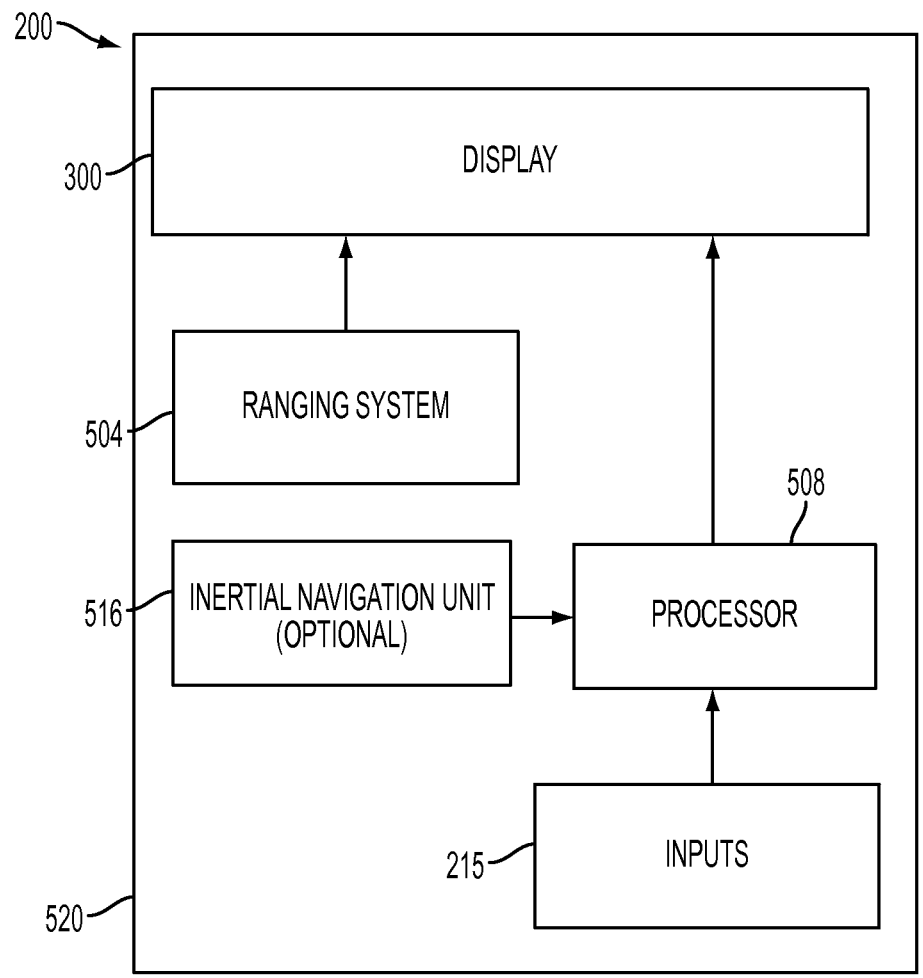
FIG. 3A is a schematic illustration of a rangefinder with improved display in accordance with the present invention.
Figure 3B:
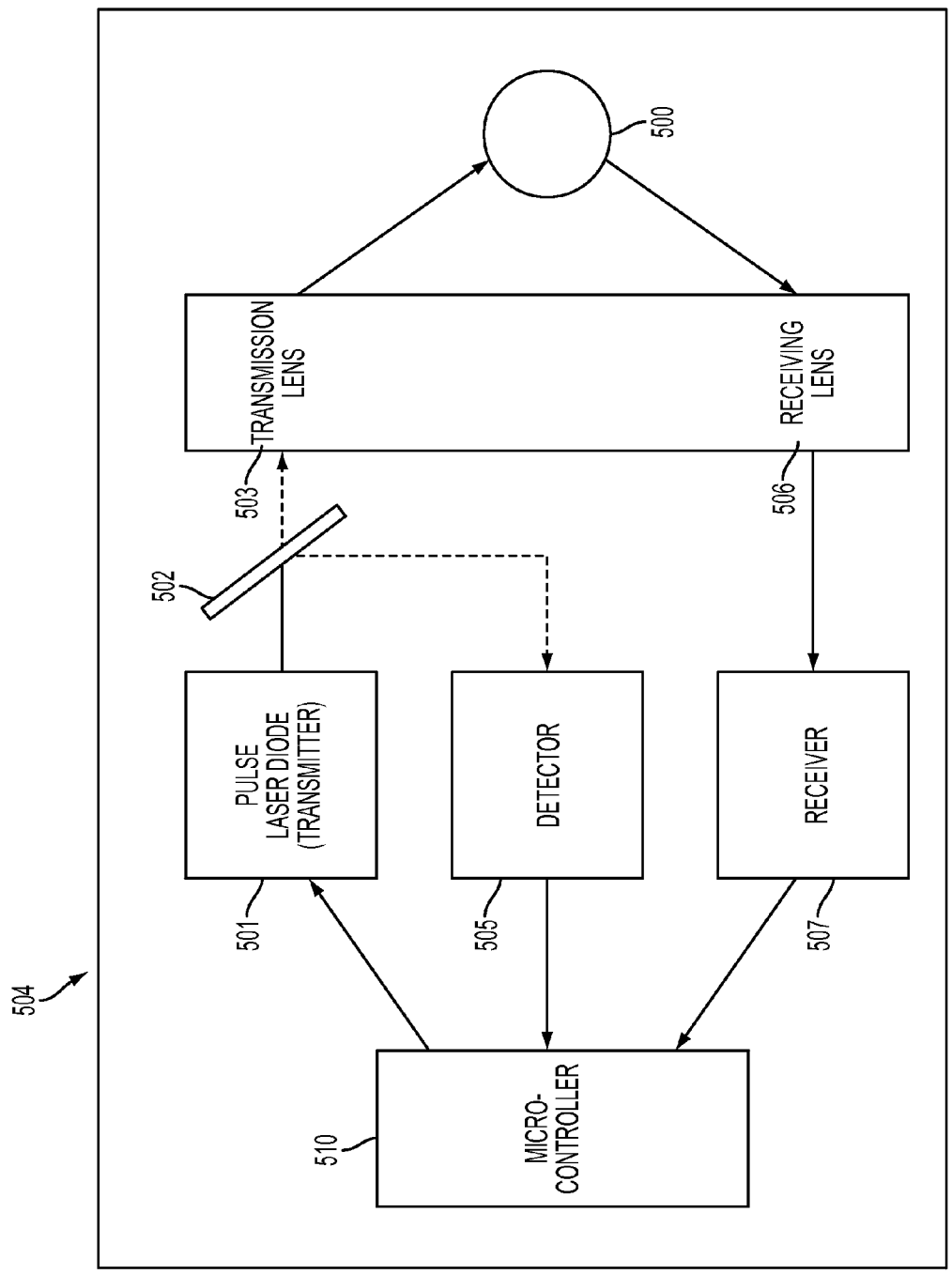
FIG. 3B is a schematic illustration of a ranging system that could be used with a rangefinder in accordance with the present invention.

FIG. 3 shows a schematic diagram of a rangefinder 200 with improved display, shown here with basic components including a body 520, a ranging system 504 for measuring a line of sight range to a target from the vantage point of the ranging system, a display 300, and a processor 508 in communication with the ranging system 504. Processor 508 could be a microprocessor or a CPU, and including memory for certain embodiments. The rangefinder 200 may also include one or more inputs 215, such as one or more buttons or a multi-position button 220 for providing information and data to processor 508. One or more inputs 215 could take many different formats capable of allowing a user to select, enter, or import data or settings into the device. Physical input mechanisms such as buttons, switches, keys or screens could be used, as well as such as ports for connections to other devices or sources (e.g. HDMI, USB ports). Such inputs may relate to many different parameters as explained in more detail below. The rangefinder 200 may also include an inertial navigation unit 516 that interacts with the processor 508.

Ranging system 504 uses a laser beam to determine the distance to an object or to a target 500, and operates by sending a laser pulse towards target 500 and measuring the time taken by the pulse to be reflected off the target and returned. The basic components of an exemplary laser ranging system 504 are shown in FIG. 3A. In FIG. 3A, a laser pulse is emitted from a transmitter, such as a pulse laser diode 501. Part of the beam emitted travels through a beam splitter 502, and part is reflected to detector 505. The emitted laser pulse travels through a transmission lens 503 to target 500, which reflects a portion of the laser pulse back through receiving lens 506 and subsequently through receiver 507 to a micro-controller unit 510, which calculates the distance to target 500 using well known mathematical principles. Ranging system 504 could also be a more complex system with additional or alternative components, including gain control components, charging capacitors, and analog to digital converters by way of example.

An inertial navigation unit 516 may be used in the rangefinder 200 connection with ballistics information to calculate information concerning bullet trajectory, hold over, or other variables that may be of interest to the user. Inertial navigation unit 516 may additionally or alternatively be used to assist with calculation and display of wind velocity and direction when the rangefinder 200 changes position, based on data from the inertial navigation unit 516, so that a new wind velocity and direction is pictured on the display 300 when the position of the rangefinder 200 has changed. In one embodiment, the inertial navigation unit 516 includes a 3-axis compass, a 3-axis accelerometer, and a 3-axis gyroscope. In other embodiments, the 3-axis compass, a 3-axis accelerometer, and a 3-axis gyroscope can be incorporated into the rangefinder 200 as individual components, with appropriate software, instead of being incorporated into the rangefinder 200 as an integral unit. And in still other embodiments, the gyroscope can be omitted. Further, other tilt sensors can be used in place of the accelerometer. Examples of other tilt sensors include an electrolytic liquid level tilt sensor, an optical bubble tilt sensor, a capacitive bubble tilt sensor, a pendulum mechanism, a rotary optical encoder, a rotary electro-resistive encoder, a Hall Effect device, and a ceramic capacitive tilt sensor.

Figure 4A:
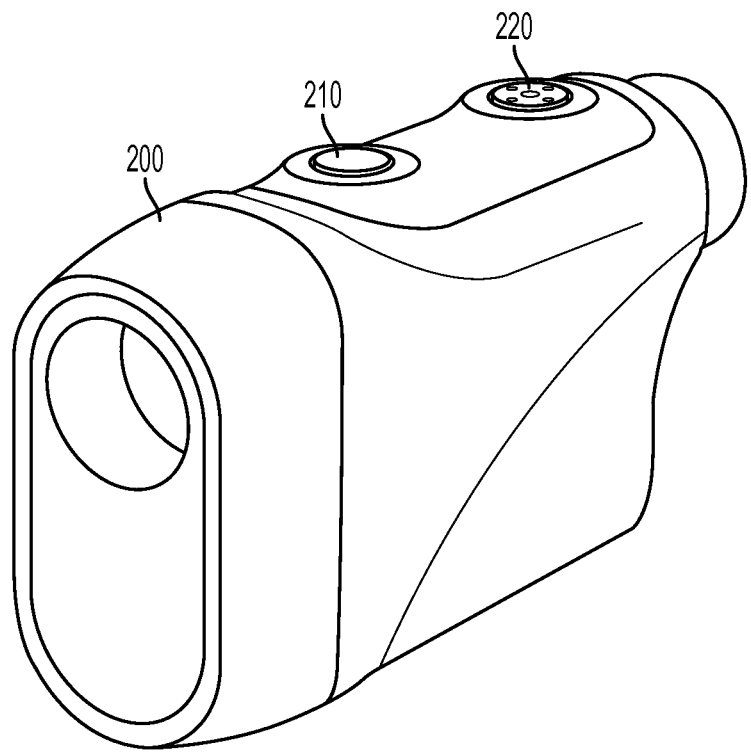
FIG. 4A is a perspective view of a rangefinder with improved display in accordance with the present invention.

In one embodiment, the laser rangefinder 200 with an improved display has a laser fire button 210 and a multi-position button 220, as seen in FIG. 4A. The rangefinder 200 may be operated in multiple "modes" having different functionality. For example, to enter user inputs or data, the rangefinder 200 may be in a "menu mode," but while in use for ranging purposes may be in a "range mode." More or less "modes" may be provided in the rangefinder consistent with the invention.

Figure 5:
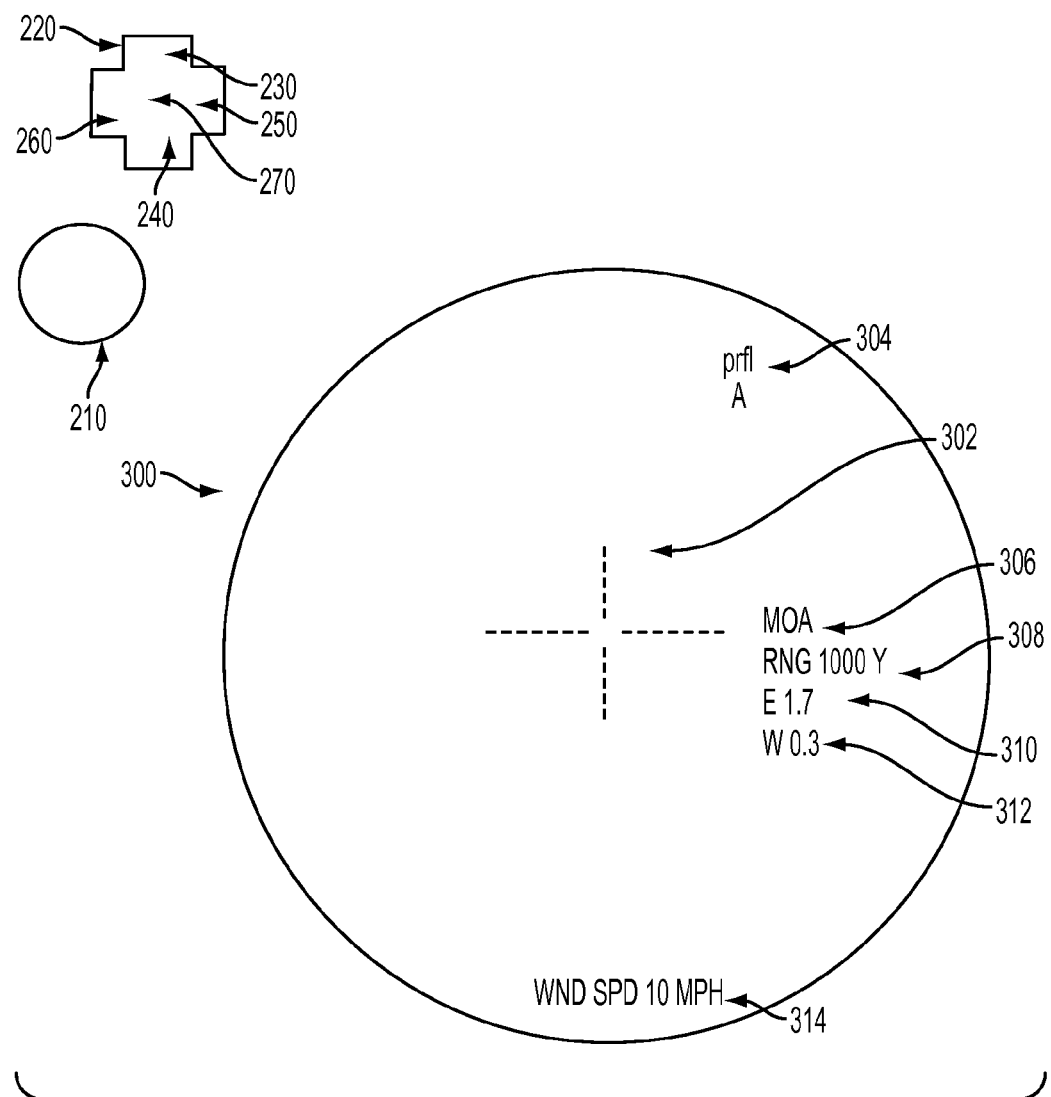
FIG. 5 is a schematic drawing of the buttons and the view when looking into the rangefinder of FIG. 4 when in "range mode."

As illustrated in FIG. 5, the rangefinder 200, when in range mode, provides a display 300. Actuation of the laser fire button 210 causes the rangefinder 200 to take measurements, such as the range with units 308, when in range mode. Other variables that can be measured when the laser fire button 210 is actuated can also be displayed on display 300, such as the unit of measure for the hold value (minute of angle, MRAD, inches, centimeters, etc.) 306, elevation hold over value 310, wind hold value 312, as well as others not shown in FIG. 5, such as barometric pressure or temperature. As shown in FIG. 5, for example, the display can also show the profile setting 304, for example, for multiple guns or set-ups, each with their own profile. In the embodiment shown, the rangefinder 200 is capable of storing multiple profiles, so a user may program some or all of the ballistics information for multiple guns, and may store the profile information for later use. The display 300 may also include a cross hair 302 for aiming in addition to data displayed as described above.

Figure 4B:
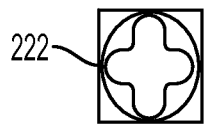
FIG. 4B is a perspective view of one multi-position button in accordance with the present invention.
Figure 4C:
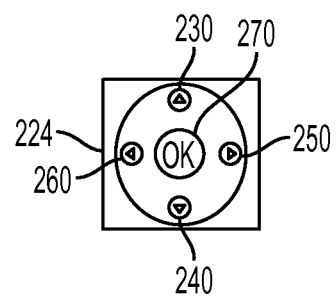
FIG. 4C is a perspective view of a second multi-position button in accordance with the present invention.

In one embodiment, the rangefinder 200 has feature-rich menus and replaces the need for a large number of buttons by using a single multi-position button 220 as a button for navigating menus and entering data, as seen in FIG. 4A. A multi-position button 220 makes navigation more intuitive through the menu options 402 and menu selections 404 (FIG. 6) when in menu mode. Of course, alternative inputs 215, buttons, or other styles of multi-position buttons 220 may be used without departing from the invention. The multi-position button 220 can be pushed left, right, forward, backward, and straight down. As alternatives, a 4-position button 222 is shown in FIG. 4B, and a 5-position button 224 is shown in FIG. 4C. A 5-position button provides flexibility with minimal amount of complexity to the user. For example, in the 5-position button 224 shown in FIG. 4C, the button can be actuated in five different directions, e.g., forward, backward, right, left, (as shown with arrows in the drawing), and straight up and down (by pressing on the center 270 of the button). However, a 4-position (e.g. FIG. 4B) or more button or switch can also be used.

One exemplary configuration includes pressing and holding the center 270 of the multi-position button 220 to enter a menu mode, as seen in FIG. 5. Once in menu mode, the various menus can be cycled by, for example, pressing the right portion 250 and left portion 260 of the multi-position button 220. The menu selections can then be adjusted, for example, by using the up portion 230 and down portion 240 of the multi-position button 220.

Figure 17:
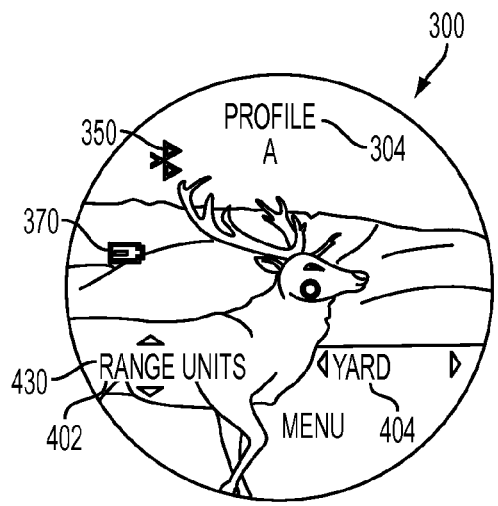
FIG. 17 is a view of the rangefinder of FIG. 4 when in "menu mode" for the "advanced mode" showing battery, Bluetooth and profile, plus a range unit selection.
Figure 18:
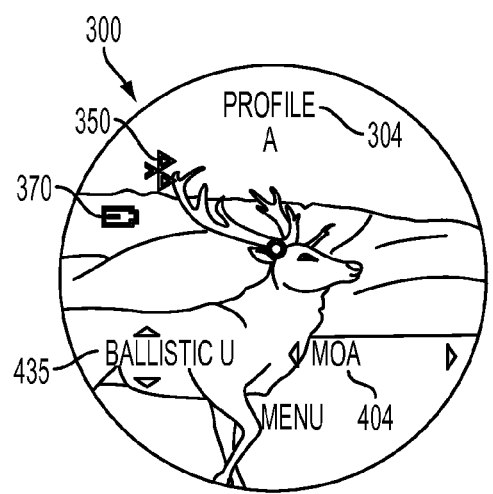
FIG. 18 is a view of the rangefinder of FIG. 4 when in "menu mode" for the "advanced mode" showing battery, Bluetooth and profile, plus a ballistic unit selection.
Figure 19:
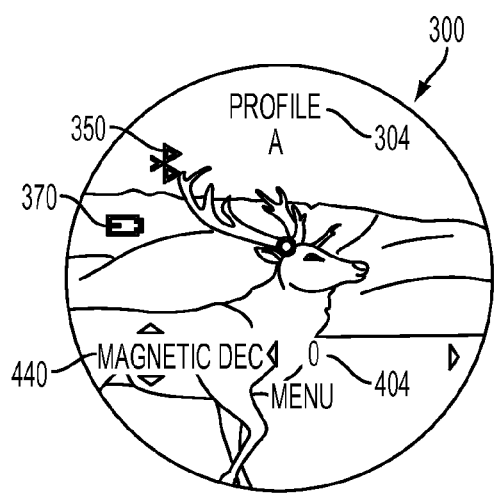
FIG. 19 is a view of the rangefinder of FIG. 4 when in "menu mode" for the "advanced mode" showing battery, Bluetooth and profile, plus a magnetic declination selection.
Figure 20:
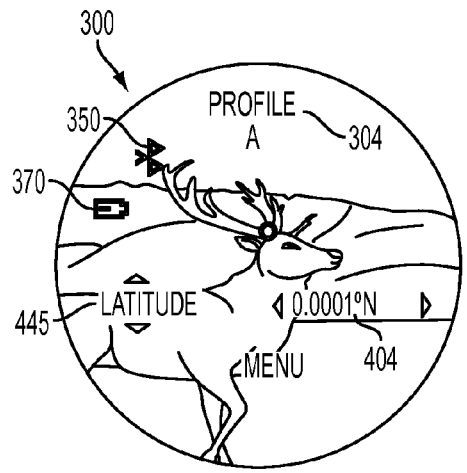
FIG. 20 is a view of the rangefinder of FIG. 4 when in "menu mode" for the "advanced mode" showing battery, Bluetooth and profile, plus latitude selection.
Figure 21:
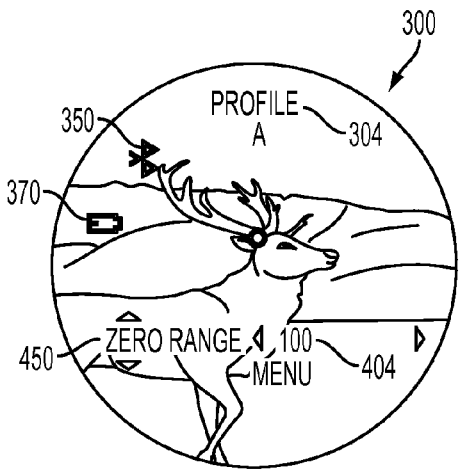
FIG. 21 is a view of the rangefinder of FIG. 4 when in "menu mode" for the "advanced mode" showing battery, Bluetooth and profile, plus a zero range selection.
Figure 22:
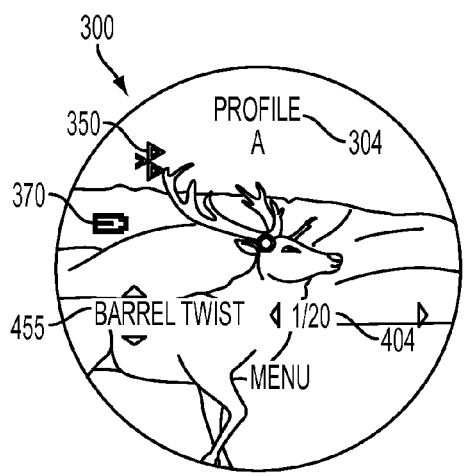
FIG. 22 is a view of the rangefinder of FIG. 4 when in "menu mode" for the "advanced mode" showing battery, Bluetooth and profile, plus a barrel twist selection.
Figure 23:
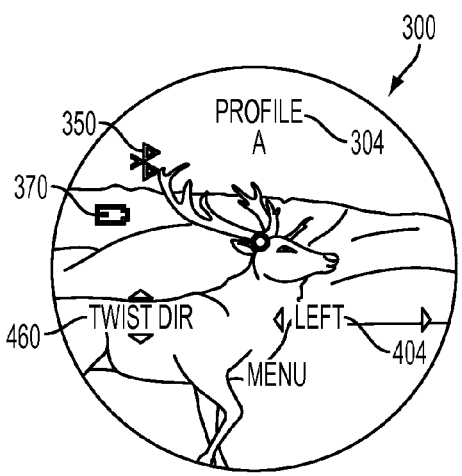
FIG. 23 is a view of the rangefinder of FIG. 4 when in "menu mode" for the "advanced mode" showing battery, Bluetooth and profile, plus a twist direction selection.
Figure 24:
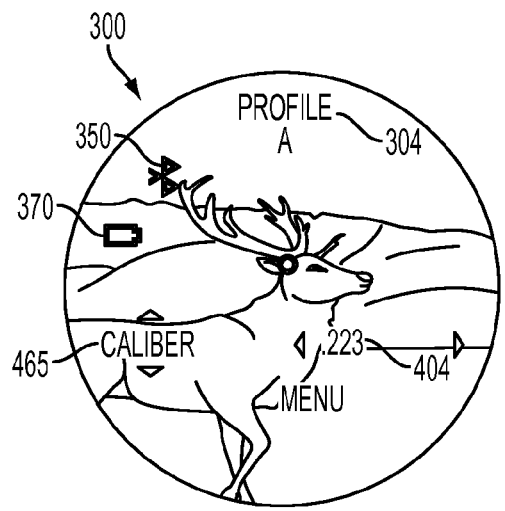
FIG. 24 is a view of the rangefinder of FIG. 4 when in "menu mode" for the "advanced mode" showing a caliber selection.
Figure 25:
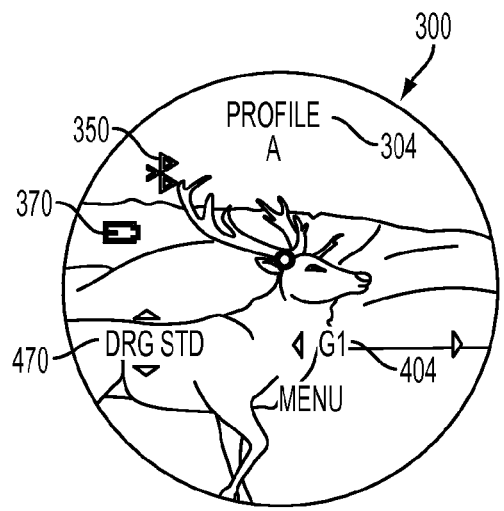
FIG. 25 is a view of the rangefinder of FIG. 4 when in "menu mode" for the "advanced mode" showing battery, Bluetooth and profile, plus a ballistic shape selection.
Figure 26:
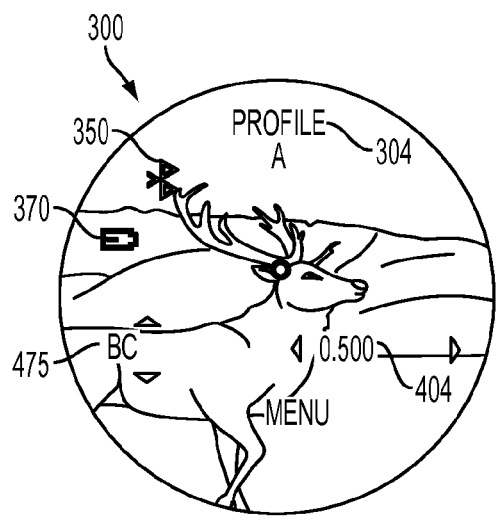
FIG. 26 is a view of the rangefinder of FIG. 4 when in "menu mode" for the "advanced mode" showing battery, Bluetooth and profile, plus a ballistic coefficient selection.
Figure 27:
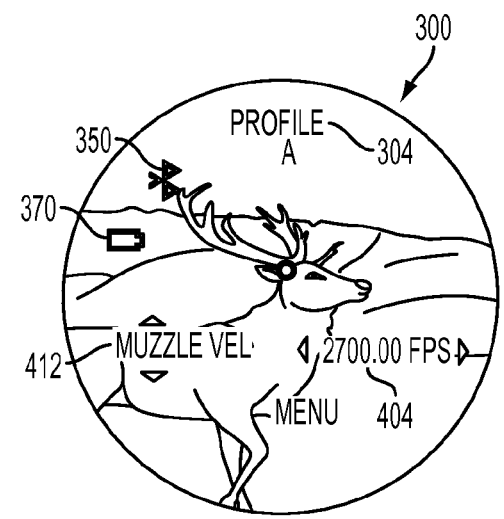
FIG. 27 is a view of the rangefinder of FIG. 4 when in "menu mode" for the "advanced mode" showing battery, Bluetooth and profile, plus a muzzle velocity selection.
Figure 28:
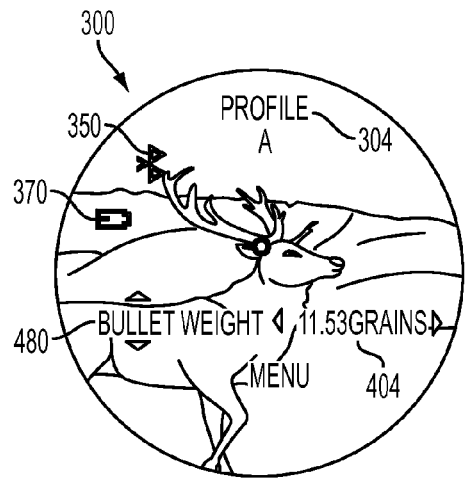
FIG. 28 is a view of the rangefinder of FIG. 4 when in "menu mode" for the "advanced mode" showing battery, Bluetooth and profile, plus a bullet weight selection.
Figure 29:
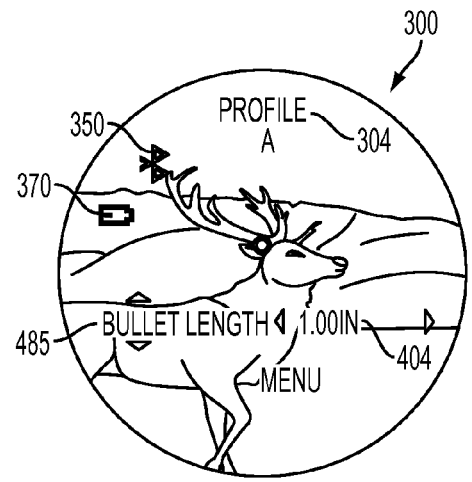
FIG. 29 is a view of the rangefinder of FIG. 4 when in "menu mode" for the "advanced mode" showing battery, Bluetooth and profile, plus a bullet length selection.

The types of variables and features that may be adjusted in menu mode using the multi-position button 220 include, but are not limited to, the profile, wind speed, ballistic coefficient, muzzle velocity, drag standard, sight height and zero range. In some embodiments, the parameters of the rangefinder 200 that can be adjusted or for which data can be entered could be classified as menu options 402 and menu selections 404. For example, menu option 402 could be the parameter or variable itself, such as range units 430, or ballistic coefficient 475 as examples. Menu selection 404 would then be the selected value or data input for that parameter, and could be provided by scrolling or clicking through options that could be selected, or could even be entered manually into rangefinder 200 itself or through data input from another device. In the range unit example (in FIG. 17), the menu option 402 allows for the selection of range units, and the user can choose from menu selections 404 for yards or meters.

Figure 6:
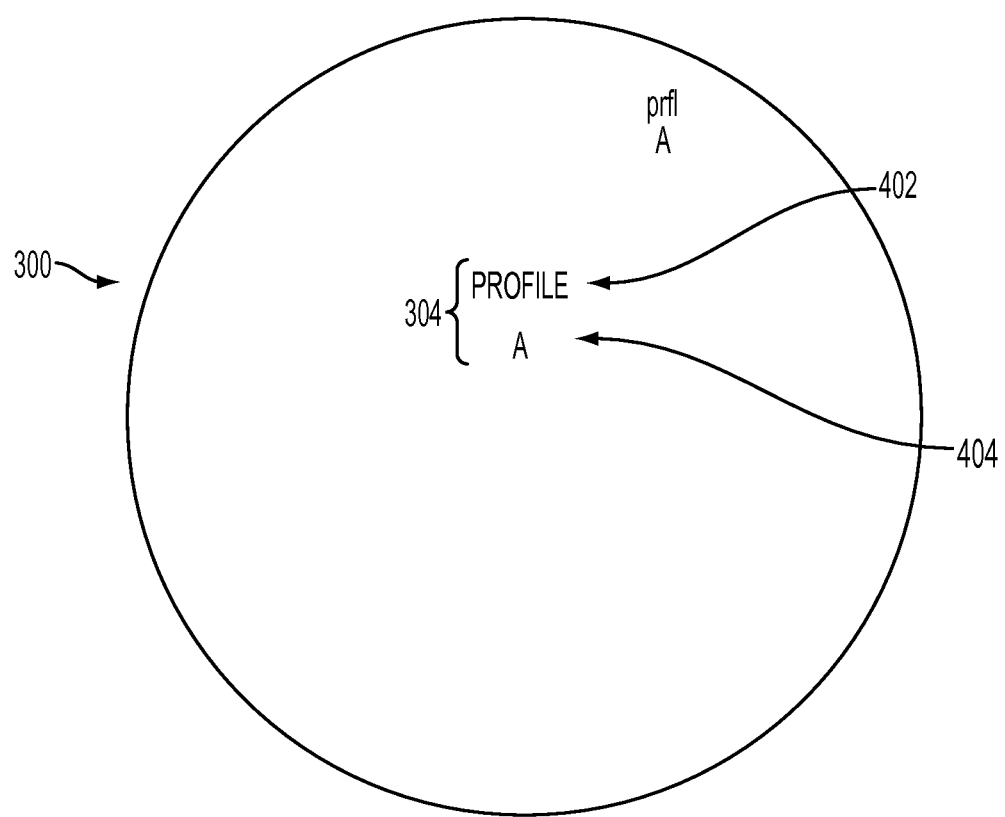
FIG. 6 is a view as seen when looking in the rangefinder of FIG. 4 when in "menu mode."
Figure 7:
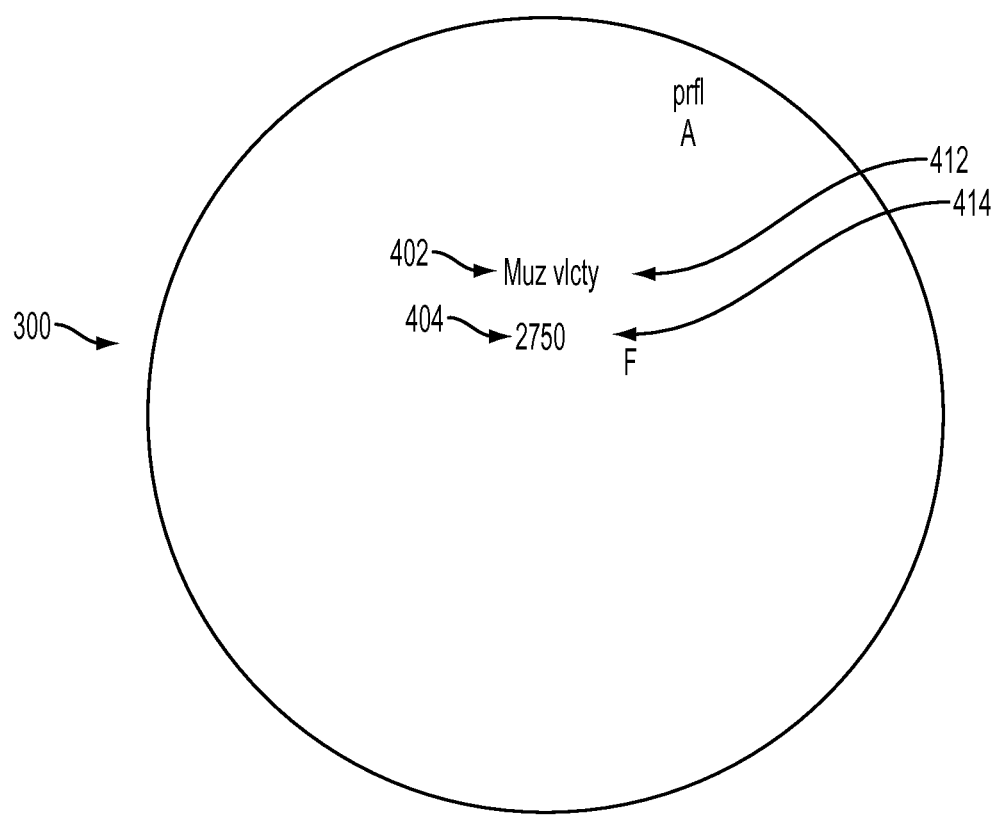
FIG. 7 is a view as seen when looking in the rangefinder of FIG. 4 when in "menu mode" and the menu option has been changed from FIG. 6.

FIG. 6 illustrates the selection of a menu option 402 and menu selection 404 for a user profile setting 304 in one embodiment. As another example, as shown in FIG. 7, a muzzle velocity option (Muz vlcty) 412 is selected by, for example, actuating the right portion 250 or left portion 260 of the multi-position button 220 until the muzzle velocity option 412 was visible. Once the desired menu option 402 is selected, in this case the muzzle velocity option 412, the menu selection 404 for that menu option 402 can be adjusted by actuating the up portion 230 and down portion 240 of the multi-position button 220. As illustrated in FIG. 7, the menu selection 414 for the muzzle velocity option 412 was adjusted to 2750 Feet.

In certain embodiments, variables that change more often, such as the profile 304 or wind speed 314, can be adjusted while still in range mode and without entering menu mode. Referring back to FIG. 5, for example, while in "range mode," the right portion 250 and left portion 260 of the multi-position button 220 can adjust wind speed 314 while the up portion 230 and down portion 240 of the multi-position button 220 can change user profile setting 304 when, for example, more than one person is shooting or different guns are being shot. When the laser fire button 210 is actuated, the rangefinder 200 will take measurements, such as the range, pressure, temperature and angle measurements. This information will be retained until the center 270 of the multi-position button 220 is actuated to delete the last measured data. The rangefinder 200 will use the saved measurements with the wind value 314 and data entered with manually entered profile settings 304 to display the appropriate ballistic data. Should some variables change, such as the wind speed 314 or direction, the up portion 230 and down portion 240 of the multi-position button 220 can be actuated while still in range mode to obtain new ballistic data in real time using the newly obtained measured values combined with the wind data and data associated with saved profile settings 304. One advantage of this operation is that only one set of measurements needs to be taken and can be applied to multiple ballistic data variables, rather than taking an independent measurement for each wind speed or profile selection.

Multiple variations on the number and arrangement of buttons is contemplated as being within the scope of the invention. In an alternate embodiment, a menu mode can be entered by pressing any button on the multi-position button 220. In another alternate embodiment, the rangefinder 200 would only have a multi-position button 220, without a range fire button 210. The multi-position switch 220 may function as the range fire button 210, when for example the up portion 230 of the multi-position button 220 is pressed for one time measurement or pressed and held for real-time continuous measurements. The multi-position switch 220 also operates as the functions button for navigating menu options 402 and identifying menu selections 404, and entering data manually, when the center portion 270 of the multi-position button 220 is pressed and held, thereby entering menu mode.

FIGS. 8-34 show representative illustrations of a rangefinder 200 with an improved display, and in particular showing examples of information provided on display 300. The illustrations shown in FIGS. 8-34 show examples of numerous menu and setting options that may be simply navigated by the user. In one embodiment of a rangefinder 200 with improved display, inputting the information necessary to complete a profile may include setting fifteen different parameters: (1) measuring system (imperial/metric), (2) range units (yards/meters), (3) ballistic units (Minute of Angle "MOA" or MRAD (metric)), (4) magnetic declination (E/W), (5) latitude (+/−0.0000 N/S), (6) zero range (100+/−), (7) barrel twist (1/20+/−), (8) twist direction (L/R), (9) caliber (7 mm, 0.338, 0.500, 0.223, 0.270, 0.308), (10) DRG STD (ballistic shape) (G1, G7), (11) ballistic coefficient (0.500+/−), (12) muzzle velocity (2700.00 f/s+/−), (13) bullet weight (11.50 grains+/−), (14) bullet length (1.00 in+/−), and (15) DOPE (keep/dump). DOPE, which stands for "Data On Personal Equipment" or "Data Of Previous Engagement." refers to elevation and windage settings stored on the rangefinder. More or less parameters may be provided in a rangefinder in accordance with the invention as well.

In the figures, FIG. 8 shows a brightness setting 320 for the display 300. FIGS. 9 and 10 show that the menu may be toggled between "basic" 330 and "advanced" 340 mode settings, for which there are less, or more, parameters that may be adjusted for use of the rangefinder. For example, in a "basic" setting, the user may have a few key parameters available for adjustment, whereas in an "advanced" setting, the user may be able to adjust and input more parameters and achieve more sophisticated customization and use of the rangefinder. Alternatively, "basic" settings may be those most commonly used, and "advanced" settings those less frequently used.

As shown in FIG. 11, for example, the rangefinder 200 may also be capable of linking to and communicating with another device using Bluetooth (as shown in Bluetooth setting 350) or any other suitable wired or wireless connection. The other device may include software that would allow a user to set profile data separate from the rangefinder 200, and then upload the data into the rangefinder. This would further reduce the complexity of using the rangefinder 200. For example, the rangefinder 200 may have a corresponding application that runs on a smartphone, such as an iPhone or Android device. A user can create a ballistic profile setting 304 on the device and then upload it to the rangefinder 200. Similarly, the rangefinder 200 may be able to keep a log or analytic data of information regarding how the rangefinder is used, which may be transferred to the smartphone or other device that a user may review later. And using either a wired or wireless interface, such as a Bluetooth connection, the rangefinder software can be regularly updated.

Figure 12:
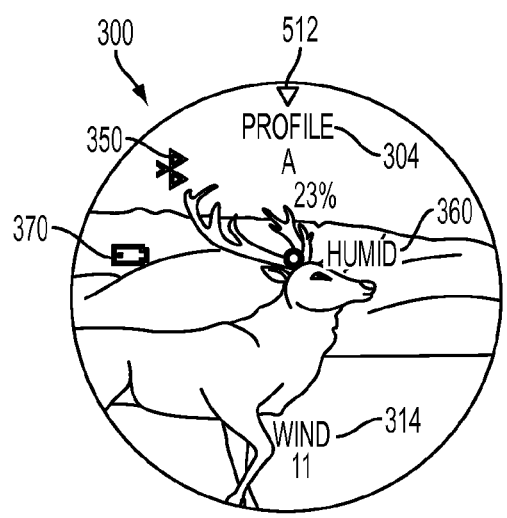
FIG. 12 is a view of the rangefinder of FIG. 4 when in "range mode," showing user profile in use, battery level, and whether Bluetooth connectivity is enabled, and also showing relative humidity and wind speed.
Figure 13:
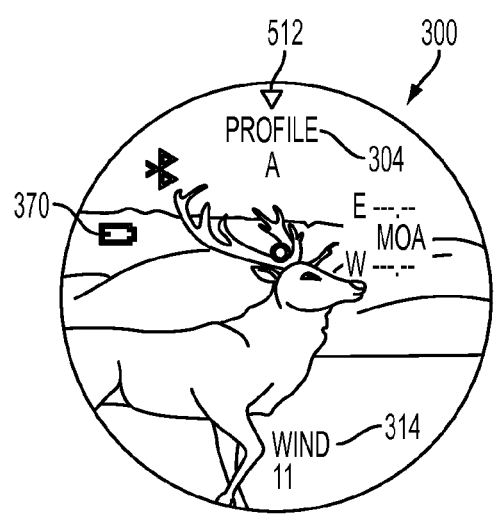
FIG. 13 is a view of the rangefinder of FIG. 4 when in "range mode," showing battery, Bluetooth and profile, plus wind speed and wind direction, before the range is determined.
Figure 14:
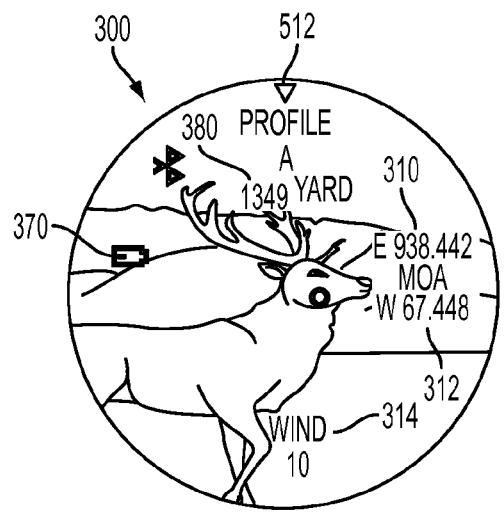
FIG. 14 is a view of the rangefinder of FIG. 4 when in "range mode," showing battery, Bluetooth and profile, plus distance and elevation and windage hold values in MOA.
Figure 15:
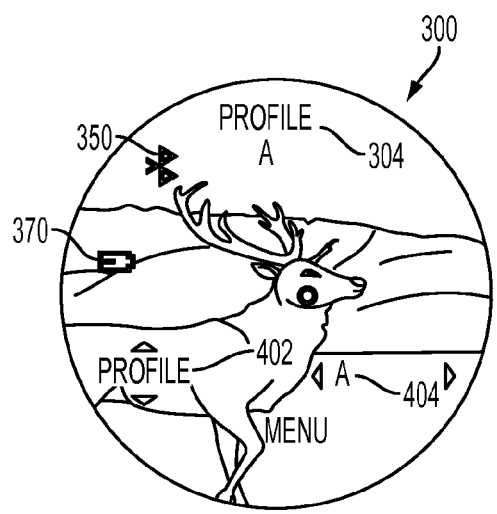
FIG. 15 is a view of the rangefinder of FIG. 4 when in "menu mode" for the "advanced mode" showing battery, Bluetooth and profile plus the selection of a profile.
Figure 16:
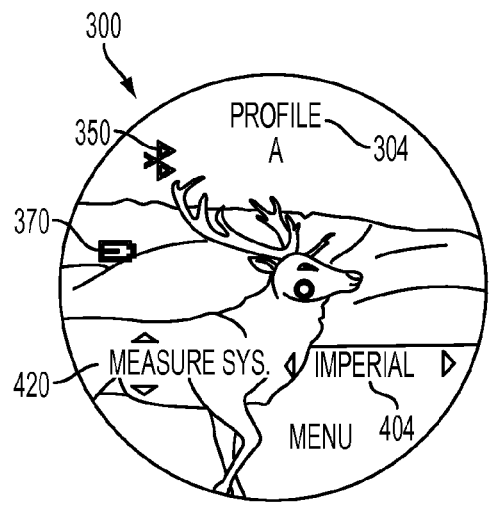
FIG. 16 is a view of the rangefinder of FIG. 4 when in "menu mode" for the "advanced mode" showing battery. Bluetooth and profile, plus a measurement system selection.

FIGS. 12-14 show parameters available in the "basic" settings for one embodiment of a rangefinder. FIG. 12 shows a number of basic device parameters, including humidity 360, wind speed 314, user profile 304 in use, battery level 370, and Bluetooth connectivity 350. FIG. 13 shows the wind speed 314 and direction (via wind indicator 512) before range is determined. After range is determined, FIG. 14 shows the range 380, that is, distance to the target along with elevation hold over value 310 and wind hold value 312 (in MOA).

FIGS. 15-30 show parameters available for adjustment in "advanced" settings for one embodiment of a rangefinder 200, for example, user profile setting 304, measurement system 420, range unit menu option 430, ballistic unit option 435, magnetic declination option 440, latitude option 445, zero range option 450, barrel twist option 455, twist direction option 460, caliber option 465, ballistic shape option 470, ballistic coefficient option 475, muzzle velocity option 412, bullet weight option 480, bullet length option 485, and dope option 490. For each of the illustrated menu options 402, the user may select from or input the desired menu selection 404.

Figure 31:
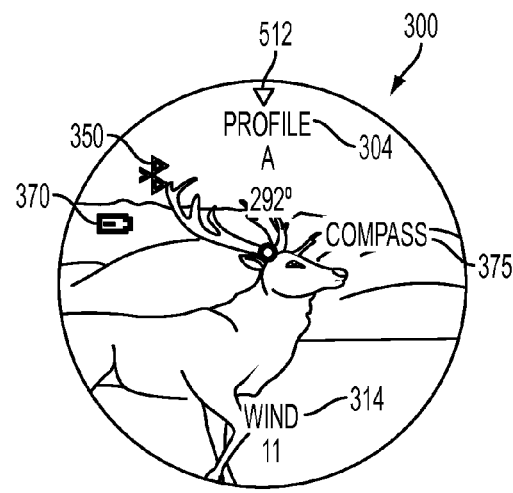
FIG. 31 is a view of the rangefinder of FIG. 4 when in "range mode" for the "advanced mode" showing battery, Bluetooth and profile, plus a compass function.
Figure 32:
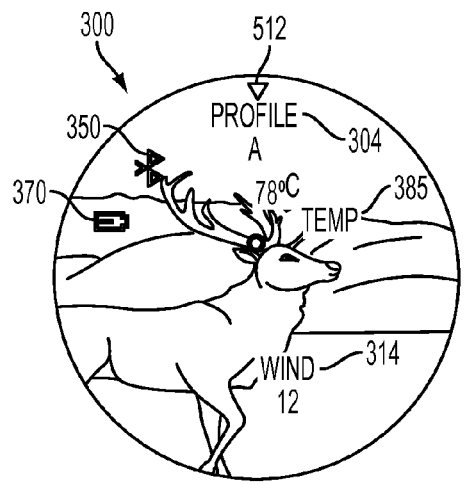
FIG. 32 is a view of the rangefinder of FIG. 4 when in "range mode" for the "advanced mode" showing battery, Bluetooth and profile, plus a temperature reading.
Figure 33:
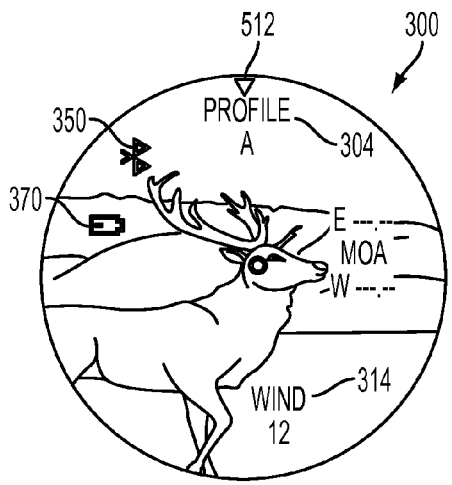
FIG. 33 is a view of the rangefinder of FIG. 4 when in "range mode" for the "advanced mode" showing battery, Bluetooth and profile, plus wind speed and wind direction, before the range, elevation, and windage are determined.
Figure 34:
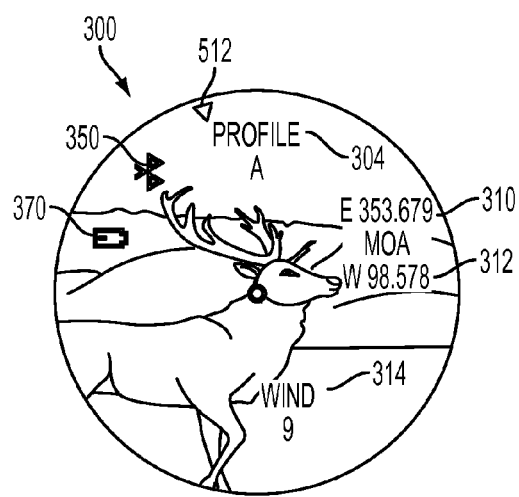
FIG. 34 is a view of the rangefinder of FIG. 4 when in "range mode" for the "advanced mode" showing battery, Bluetooth and profile, plus the calculated elevation and windage settings.

A rangefinder 200 may also include certain environmental sensors 530 such as a thermometer, compass, pressure sensor, sensors for measuring humidity, wind direction and speed, or other environmental features. FIGS. 31 and 32 show a compass function 375 and temperature reading 385 respectively. FIG. 33 shows a rangefinder display 300 when "advanced" settings are in use, in particular showing the wind speed and direction, before range, elevation, and windage are determined. FIG. 34 shows an example of calculated elevation and windage settings in an advanced mode embodiment.

As described above, the process of inputting all of the necessary data may be greatly simplified using the multi-position button 220, which requires only one finger to use. To use the rangefinder, the user can select a "profile" or enter his or her ballistics information using the multi-position button 220 described above. Then the user can use the up portion 230 and down portion 240 on the multi-position button 220 to set the current wind speed, and the user can use the left portion 260 and right portion 250 to move the arrow around the perimeter of the display 300 to indicate the wind direction. After wind speed and wind direction are provided, the user can aim at a target, and press the laser fire button 210, which will calculate and display the distance to the target (i.e. range 380), as well as the elevation and windage settings (310, 312) the user would need for the shot, based on the ballistics information previously provided.

Figure 30:
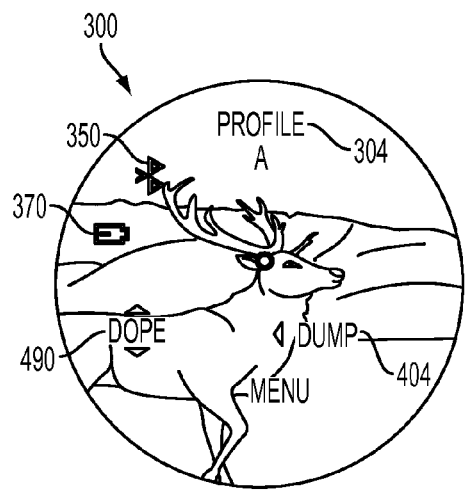
FIG. 30 is a view of the rangefinder of FIG. 4 when in "menu mode" for the "advanced mode" showing battery, Bluetooth and profile, plus a dope selection.

In certain embodiments, the rangefinder 300 can select to "keep" or "dump" DOPE information. FIG. 30 shows the screen where the user selects the "keep" or "dump" setting. There are two schools of thought on retaining DOPE information after taking a range. Some users would like to take a range and get their DOPE information (windage and elevation adjustments) for a precise shot and have that information stay on the screen until another range is taken. If the user selects "keep," the DOPE information will remain stored in the rangefinder until another range is taken. Even in "keep" mode, the screen powers OFF after a certain amount of time (e.g. 10 seconds) to save battery life. If a user forgets their DOPE information after the screen powers off, they can simply press the laser fire button 210 once to turn the display 300 screen back on and their DOPE information is still on the display. Often, very long range shots with a rangefinder are difficult to accurately range because the target can be very small and you have to hold the rangefinder very steady. It can sometimes take many ranges to feel comfortable that the rangefinder actually ranged off the precise target. Thus, it is advantageous to be able to "keep" the DOPE stored in the rangefinder indefinitely until another range is taken, even after the screen powers down, and is powered back up.

Another school of thought is that a user does not want to use "old" or outdated DOPE and cause another possible user to dial in the wrong DOPE, which may cause the other user to miss the shot. This is especially true in military applications when shooting at multiple targets. The user may range multiple targets, set the rangefinder down, and then forget which target was used for the last range/DOPE information. The user may then pick up the rangefinder after a few minutes and power the display screen back up and use information the user thinks is correct, but it is actually for an old or different target. To prevent this scenario, a user would set the DOPE setting to "dump". In "dump" setting, every time after the screen powers down, the rangefinder erases or "dumps" the DOPE information and requires the user to take another range to get new DOPE information.

As shown in FIGS. 13 and 33, wind data may be entered through the menu system in an extremely easy, intuitive, and fast manner. Wind data can also be adjusted after a range is taken to adjust a user's ballistic information. Wind data, such as wind velocity and direction, can be entered into the rangefinder 200 and used by the processor 508 by way of environmental sensors 530, or by entry via the multi-position button 220. FIG. 13 illustrates a display 300 in a basic mode showing the current wind speed and direction before windage and range data are determined. Similarly, in the advanced mode, FIG. 34 illustrates a display 300 showing the current wind speed and direction before range, elevation and windage are determined.

In one embodiment, wind data may be provided to the processor using the multi-position button 220. As shown in FIGS. 13 and 33 a wind indicator 512 is provided in the display 300. Wind indicator 512 may be an arrow, pointer, cursor or other marker. As shown in the figures, the wind indicator 512 is an arrow that points to the center of the display and can be rotated 360 degrees around the outer edge of the display. As shown in the drawings, around the outside edge of the view on the display 300 of the rangefinder 200, which may be an OLED, LCD, or similar type display, there is a single arrow at the edge of the display, which points to the center of the display. It will be immediately intuitive to the user that this display simulates the user being at the center of the display, and the wind being at the edge of the display. By having an arrow pointing towards the center of the display, it is obvious to the user that they need to simply move the arrow, using the left/right positions of the multi-position button 220, to the position that the wind is coming from. It is therefore more difficult to mix up the wind "coming from vs. going to phenomenon," as it is when using a numerical wind direction, or if a user were to have the arrow across the whole display, or if the user had an arrow at the center or outer edge of the display pointing outwards, since the user would not know if the arrow was pointing at where the wind is coming from, or going to.

Thus to use the wind indicator 512 in the drawings, the user can imagine that they are standing at the center of the display and would use the multi-position button 220 to place the wind indicator 512 at the clock code position of where the wind is coming from as they face the target. For example, if the user is facing their target and the wind is coming from their 3 o'clock position at 10 mph, they would use the multi-position button 220 to move the wind indicator 512 to the 3 o'clock position, and also use the multi-position button 220 to increase or decrease the wind speed to 10 MPH, then fire the laser to get their DOPE and range to target. If the rangefinder includes a built-in compass, which can also compensate for magnetic variation, the rangefinder 200 will also record the true bearing it is facing when wind data is being entered by the user, or when calculating a range. The processor 508 of the rangefinder 200 can then calculate the bearing direction of the wind, and use these calculations to give the best ballistic solution, taking into consideration any magnetic shift away from true north, and any Coriolis Effect. Thus, the user can simply place an arrow at the clock code of where the wind is coming from, and then set the wind speed before ranging.

Once a user sets the wind direction and speed, it is stored in memory of processor 508. The next time a range measurement is taken, the rangefinder 200, using the inertial navigation unit 516, knows which direction it is facing, and also knows which direction the stored wind is coming from, and the rangefinder 200 can display the wind indicator 512 appropriately to graphically display the user's new relative wind direction, so that it indicates the direction of the wind on a clock face, as if one were positioned above the device.

Using clock codes is easier than having to take out a compass, GPS, or other measuring device, to determine the wind direction. This graphical interface means the user does not need to know the actual compass heading of the wind direction, or the actual compass direction the laser rangefinder is facing, since this is all done "under the hood" of the rangefinder 200. The user only needs to determine, once facing their intended target, which way the wind is coming from, relative to the direction of their target. For example, if one is facing a target and the wind is coming from directly behind them (at "6 o'clock") the user will scroll the wind arrow to the bottom of the screen, so that the arrow is facing up, which simulates the wind coming from behind the user. In yet another example if the wind is off one's left shoulder the user simply scrolls the wind arrow to the "9 o'clock" position on the display. Lastly, the user would enter their wind speed using the up/down positions of the multi-position button 220, using any appropriate increments of the wind speed. For the sake of this explanation, 1 mph increments will be used. The user determines the wind speed using any desired method. For example, the user can estimate the wind based on simple experience. This is usually accurate enough to compensate for all but the most extreme long range, precise shots. Alternatively, the user can also use a hand held wind meter, or could use wind data from a weather app, weather channel, weather radio, or any other suitably reliable source.

The most important factor in wind is the average wind over the distance of the flight path of the bullet. The wind direction and speed can be variable over long distance shots. For this reason, portable wind devices are limited in their value, because they only give you wind reading at your current location, but not over the range of the shot. There are wireless devices that can be placed in intervals across a range of fire, but this is usually impractical for hunting, law enforcement, or military applications. Weather radio, weather channel, or smartphone applications also do not have micro-local wind data. The best current method then is to allow the user to fine tune the wind data based on the user's own observations. Using wind device information, grass movement, dust movement, etc., the user can determine the average wind direction and speed over a range of fire, and then set that wind into the rangefinder.

Because most rangefinders power down after a period (e.g., 10 seconds) of non-use, it is important that the wind is kept in memory. The next time the rangefinder 200 is turned on, the compass takes an instantaneous reading of its direction, and then displays the wind arrow at the appropriate place on the display that corresponds to the stored wind direction. Again, the user does not need to know what the numerical bearing of the wind is, as this is all stored in the processor 508 or in the memory of the rangefinder 200. This wind data can be used for calculating display data such as elevation hold over value and windage settings for multiple targets.

For example, if one is facing 360 degrees, and the wind is off of the user's right shoulder, the user puts the wind indicator 512 at a 3 o'clock position. The user then sees an arrow at 3 o'clock facing the center of the display (the simulated user's position in a bird's eye view profile). The device knows it is facing 360 degrees (due north) and it knows the indicator is at 090 degrees (due east), so it stores a 090 wind and whatever wind speed value the user sets. The wind direction of 090 degrees is not necessarily displayed to the user (although it can be) and it is not even necessary because the actual direction is associated with the position of the arrow and stored "under the hood." Once the wind indicator 512 is set, the user can pan the rangefinder 200 left or right and the arrow will real-time adjust to keep track of where the 090 degree position is in relation to the direction the rangefinder 200 is pointed.

Next assume the user walks for a while and finds a new target. Now the user is facing 270 degrees (due west). If using a rangefinder 200 in accordance with the invention, the user does not need to know which direction he or she is facing. When the user turns on the rangefinder 200, an immediate compass direction reading is taken by the onboard inertial navigation unit 516 and the rangefinder 200 processor 508 determines it is facing 270 (due west). The last stored wind value, set by the user, was 090 (due east). The wind indicator 512 can then automatically be shifted to the bottom of the display 300, which is the 6 o'clock position, which is directly behind the shooter, because that is where the wind was last coming from. The user never needs to keep track of the wind because the rangefinder 200 and the wind tracking feature does it for the user. If the wind had shifted or changed velocity, adjustments to saved wind data can be easily made using the multi-position button 220 to fine tune the wind direction and speed. Even if the user forgets to fine tune the wind data, the device will still likely give a much better ballistic solution than no wind compensation at all. Also, with the ballistic DOPE Keep/dump feature, the user can actually change the wind after the fact, and the ballistics will real-time adjust to the proper solution before re-computing the math. This means the user can forget to fine tune the wind until after the range is taken.

Figure 36:
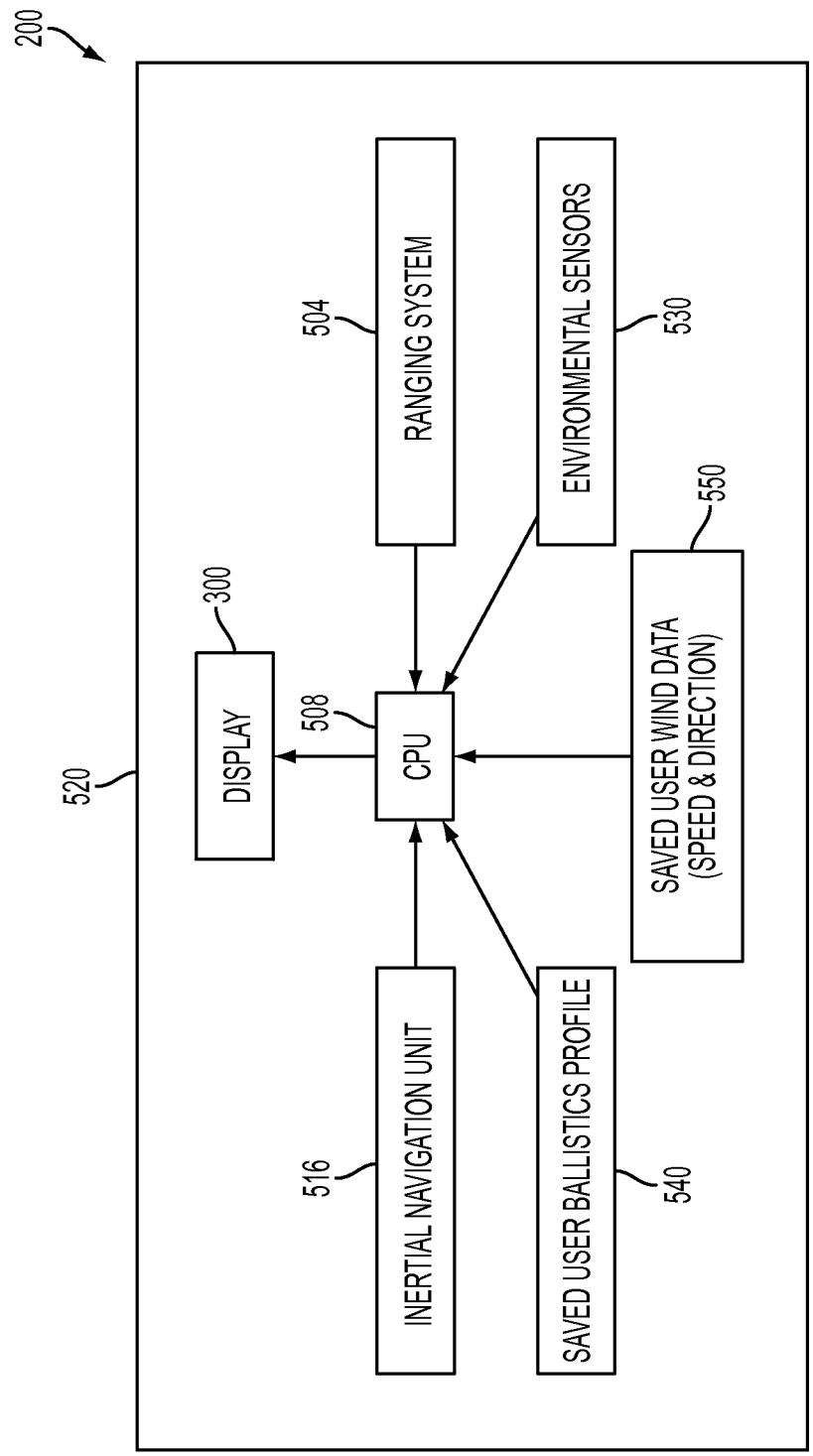
FIG. 36 is a schematic illustration of a rangefinder with improved display in accordance with the present invention, showing several input sources for the processor, including an inertial navigation unit, a saved user ballistics profile, saved user wind input, environmental sensors, and a ranging system.

FIGS. 36, 37A, 37B, and 37C further illustrate one embodiment of a rangefinder 200 with an improved display, including a ranging system 504, environmental sensors 530, an inertial navigation unit 516, saved user profile settings 540, and saved user wind input 550. It should be understood that not all of these features need to be included in the rangefinder 200 to be included within the scope of the invention, but FIG. 36 is provided here to illustrate that all of these features can provide input to processor 508, which in turn can provide output data for viewing in display 300. Additional features or inputs may be included as well. As shown in FIG. 36, rangefinder 200 includes a body 520 in which several components are contained, including: display 300, processor 508, ranging system 504, environmental sensors 530, and inertial navigation unit 516. In this schematic, box 540 represents a ballistics user profile, and box 550 represents saved wind data (such as speed and direction) stored in memory in the device, perhaps in processor 508. A saved ballistics profile 540 could be provided as described above and include saved ballistics profile data for the user's gun and ammunition. Saved wind data 550 could be provided as described above as well.

Figure 37A:
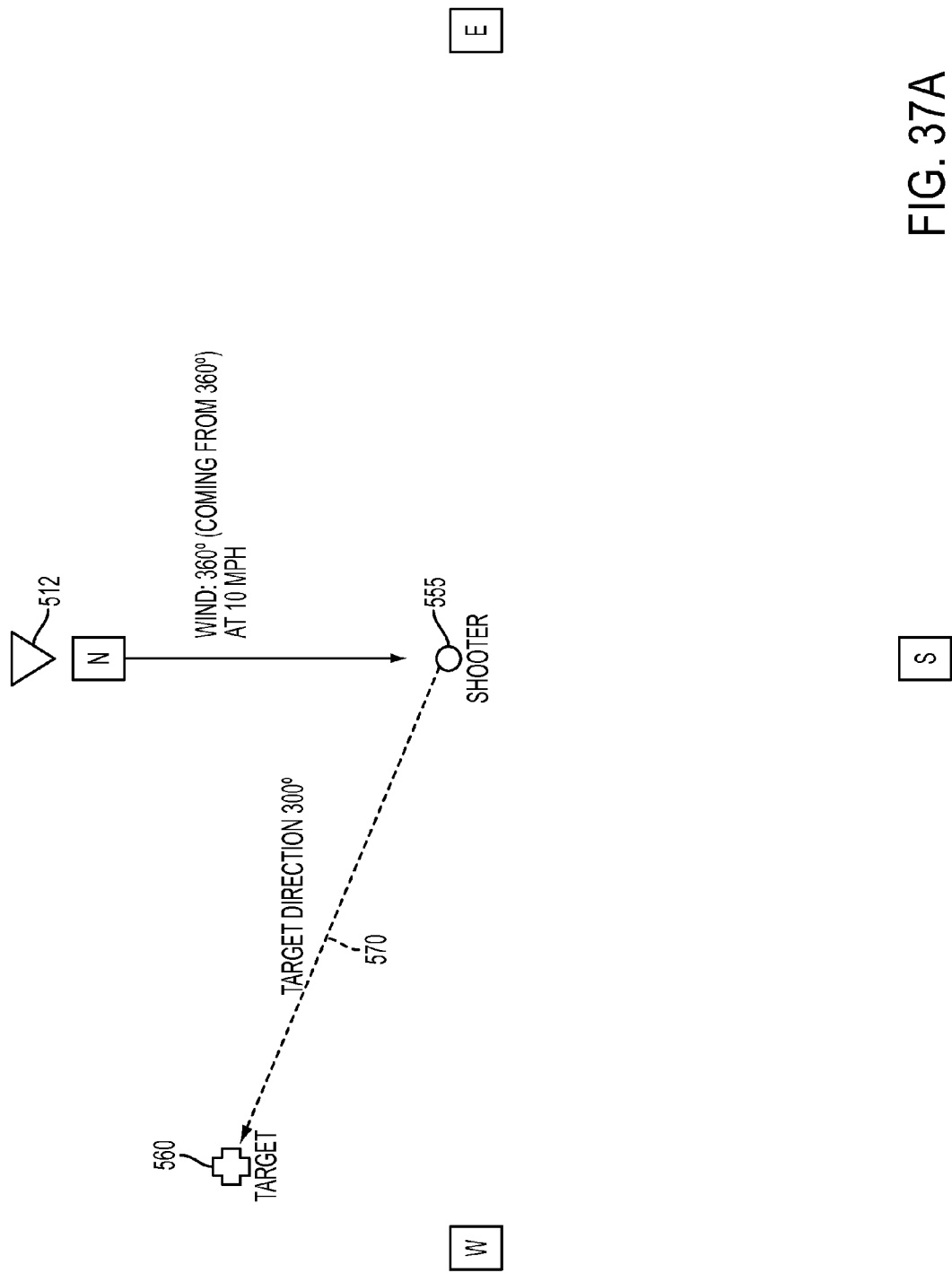
FIGS. 37A, 37B and 37C are a series of schematic drawings illustrating how an inertial navigation unit in a rangefinder in accordance with the invention can allow stored wind data to be applied to a new target without re-setting other data inputs.
Figure 37B:
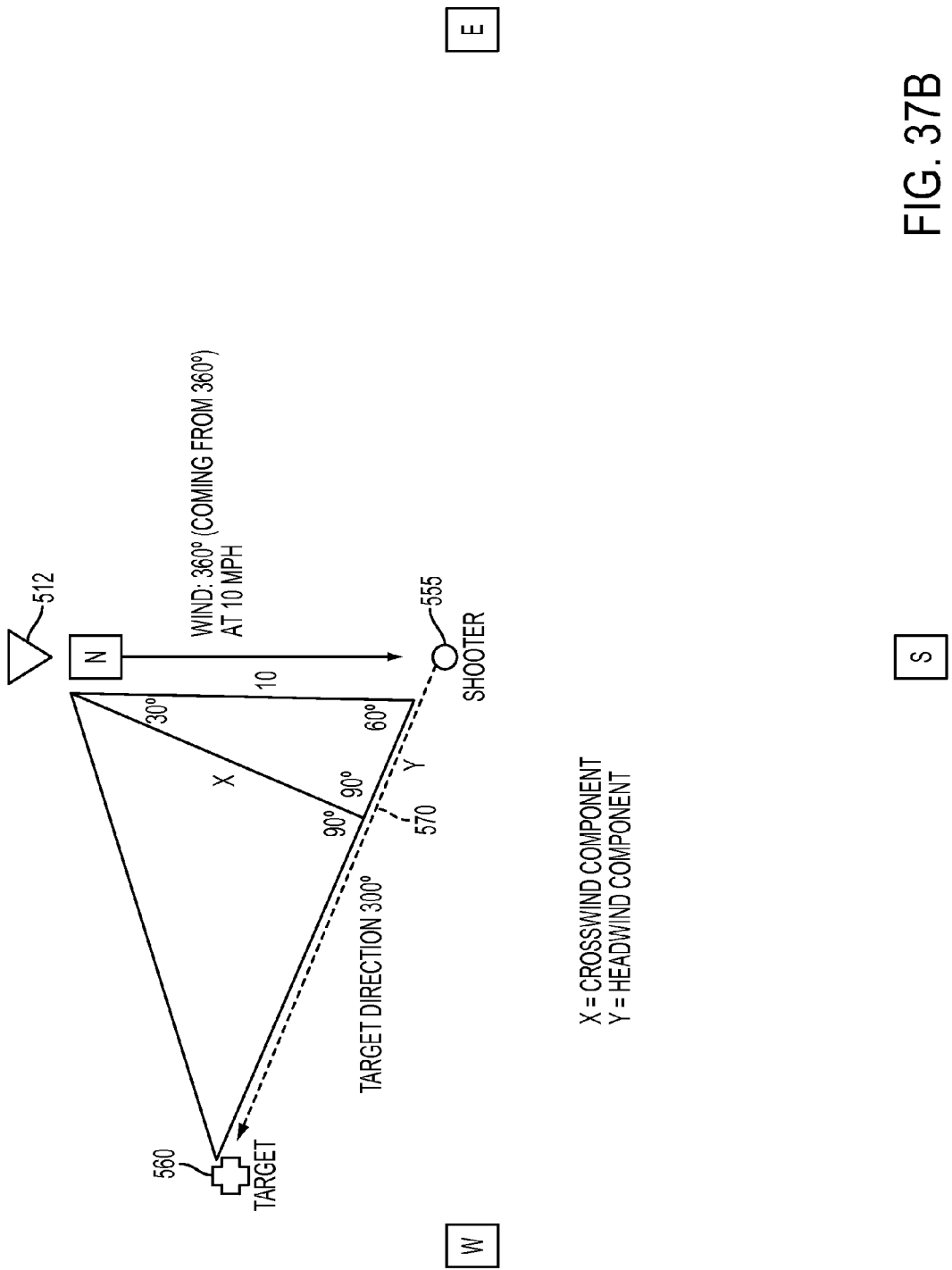
Figure 37C:
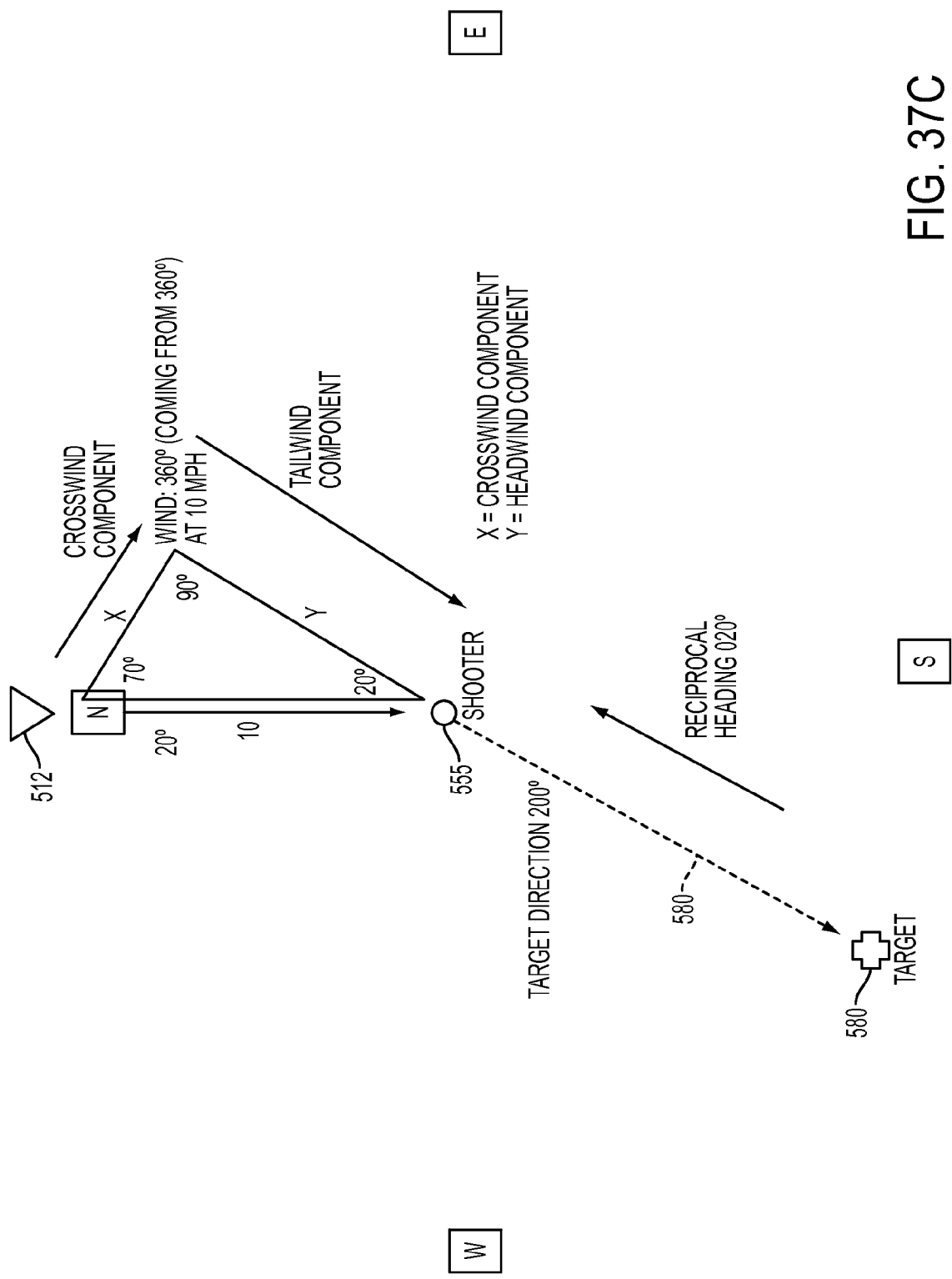

FIGS. 37A, 37B and 37C demonstrate how saved wind data 550 can be used together with the inertial navigation unit 516, saved ballistics profile information 540, and the ranging system 504 to very quickly provide a new ballistics solution for a new target. FIG. 37A shows a shooter's position 555 relative to a first target 560 at a first range 570, in which the shooter sets the wind indicator 512 on rangefinder 200. In FIG. 37A, the wind is coming from due north (360°) at a speed of 10 mph; first target 560 is at 300°.

FIG. 37B shows that the vector components of the wind can be broken down into a crosswind component and a headwind component, and can then be applied to the stored ballistics information (perhaps from a user profile) to calculate and provide the corrected ballistics solution for the given wind direction and speed. In FIG. 37B, "x" is the crosswind component; "y" is the headwind component. Using the calculation: Sin 30=y/10, and solving for "y" provides the headwind component of 5 mph. And, using the calculation: Cos 30=x/10, and solving for "x" provides the crosswind component of 8.66 mph. Applying the 5 mph headwind and 8.66 mph right crosswind to the ballistics data for the first target 560 at first range 570 as determined by ranging system 504 and processor 508 results in a corrected ballistics solution that can be provided on display 300 for the first target 560.

Figure 35:
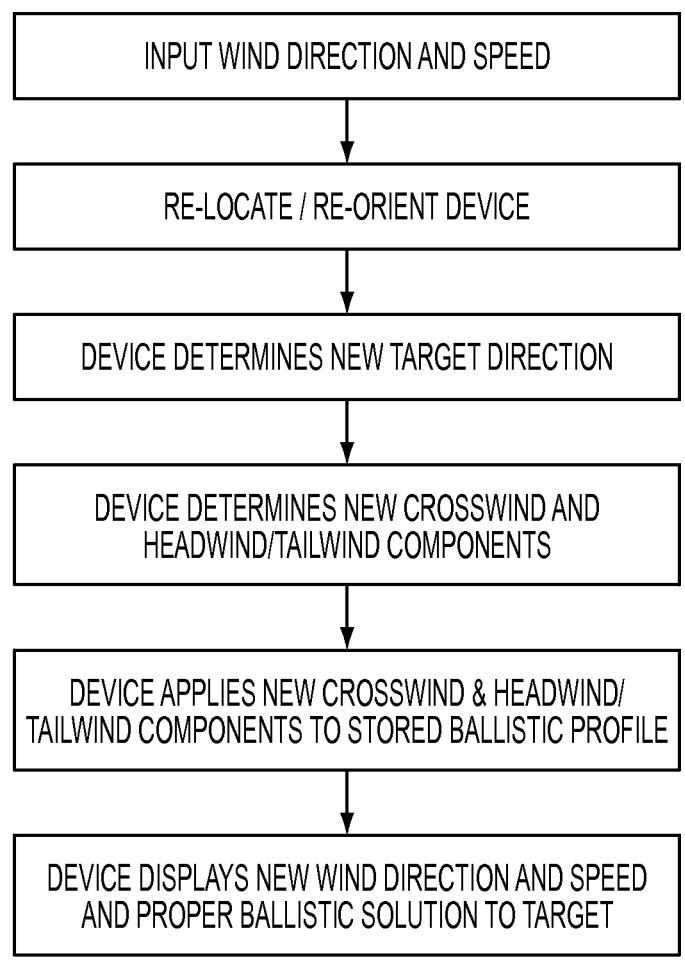
FIG. 35 is a flow diagram showing a method of displaying wind information on a rangefinder display.

If the user turns around at position 555 for a second target 580 at a second range 590, the saved wind data and other saved data can be used to calculate a second corrected ballistics solution as shown in FIG. 37C. In FIG. 37C, the calculations are adjusted for a second target 580 at direction 200°, using the same wind and ballistics data. The inertial navigation unit 516 allows the new aiming direction for second target 580 to be applied to the original wind input for the processor 508 to calculate new crosswind and headwind (or tailwind) components. In the example in FIG. 37C, "x" is still the crosswind component and "y" is now a tailwind component. Using the calculation: Sin 20=x/10, and solving for "x" provides the crosswind component of 3.42 mph. Similarly, using the calculation: Cos 20=y/10, and solving for "y" provides the tailwind component of 9.4 mph. Applying the 9.4 mph tailwind and the 3.42 mph right crosswind to the ballistics data for second target 580 at second range 590 as determined by ranging system 504 and processor 508 result in a corrected ballistics solution for the second target 580 that can be provided in display 300. This functionality could also be applied for additional targets and in different locations, for example if the shooter moves to a new location with similar wind speed and direction. The example illustrated in FIGS. 37A, 37B and 37C assumes that the wind speed and direction remains the same. But if the wind speed or direction has changed, the user can easily adjust the wind indicator 512 or other wind input data for the changed conditions. FIG. 35 is an illustration of this process in a step diagram.

Although the invention has been herein described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein.

What is claimed is:

1. A rangefinder including:
a laser ranging system for measuring a distance to a target, a display,
a processor in communication with the laser ranging system and capable of producing an image on the display,
an input for inputting a wind direction into the processor, wherein the wind direction is as perceived by a user and without reference to a directional measuring device, by moving an indicator around a periphery of the display image and selecting the perceived wind direction represented by the indicator, and further wherein the input for inputting wind direction is a multi-position button in communication with the processor, and wherein the processor is capable of producing an updated image on the display in response to manipulation of the button; and
an input for inputting a wind speed into the processor by selecting a numerical wind speed value from a menu.

2. The rangefinder of claim 1 wherein the indicator is an arrow pointing the direction from which the wind is blowing.

3. The rangefinder of claim 2 wherein the arrow points towards the center of the display.

4. A rangefinder including:
a laser ranging system for measuring distance to a first target from a first location, a display, a processor in communication with the laser ranging system and producing an image on the display, an input for providing a wind direction data into the processor, wherein the wind direction is as perceived by a user and without reference to a directional measuring device, by moving an indicator around a periphery of the display and selecting the perceived wind direction represented by the indicator, wherein the indicator is an arrow pointing towards a center of the display and moved around the periphery of the display to also point in a direction the wind is blowing, and further wherein the input for inputting the wind direction is a multi-position button in communication with the processor, and wherein the processor is capable of producing an updated image on the display in response to manipulation of the button;

an input for inputting a wind speed data into the processor by selecting a numerical wind speed value from a menu, and an inertial navigation unit in communication with the processor, the inertial navigation unit capable of detecting a directional orientation, the processor capable of storing the wind direction data and the wind speed data for calculating and displaying a new wind speed and a new wind direction when the rangefinder changes position, based on a data from the inertial navigation unit.

5. The rangefinder of claim 4 wherein the processor further calculates and displays a windage setting and an elevation setting for the first target on the display.

6. The rangefinder of claim 5 wherein the processor uses the stored wind speed and the stored wind direction data from the first target and further calculates a windage and an elevation setting for a second target measured from a second location based on the stored wind speed and direction data.

7. A method of viewing information in a rangefinder, comprising the steps of:

providing a wind data to a processor in the rangefinder, the rangefinder also comprising a display, a laser ranging system, and an inertial navigation unit, the wind data provided using an input for providing a wind direction data into the processor, wherein the wind direction is as perceived by a user and determined without reference to a directional measuring device, by moving an indicator around a periphery of the display and selecting the perceived wind direction represented by the indicator; wherein using an input for providing the wind direction comprises using a multi-position button to move an arrow-shaped indicator around the periphery of the display until the indicator points in the direction a user perceives the wind is blowing, and an input for inputting a wind speed data into the processor by selecting a numerical wind speed value from a menu;

providing a ballistics data to the processor in the rangefinder, taking a distance measurement to a first target from a first location using a laser ranging system of the rangefinder, the processor calculating an elevation and a windage hold value based on the distance measurement taken, the ballistics data, and the wind data provided; and viewing the calculated elevation and the windage hold values in the rangefinder display.

8. The method of claim 7, wherein the ballistics data is stored in a ballistics data processor.

9. The method of claim 7, comprising the additional steps of:

taking a distance measurement to a second target from a second location using the laser ranging system of the rangefinder, the processor calculating an elevation value and a windage hold value based on the distance measurement taken, the ballistics data, the wind data provided, and the data from the inertial navigation unit; and viewing the calculated elevation and the windage hold values in the rangefinder display for the second target.

10. The method of claim 9, wherein the wind data and the ballistics data is the same for both the first and second target.

11. The method of claim 7, wherein the indicator is movable in 30 degree increments.

* * * * *